US009497414B2

(12) United States Patent
Wu et al.

(10) Patent No.: US 9,497,414 B2
(45) Date of Patent: *Nov. 15, 2016

(54) TELEPHONE WITH VIDEO FUNCTION AND METHOD OF PERFORMING VIDEO CONFERENCE USING TELEPHONE

(71) Applicant: CORETRONIC CORPORATION, Hsin-Chu (TW)

(72) Inventors: Chia-Chien Wu, Hsin-Chu (TW); Wen-Chang Chien, Hsin-Chu (TW); Tzu-Shou Kuo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 344 days.

This patent is subject to a terminal disclaimer.

(21) Appl. No.: 14/139,881

(22) Filed: Dec. 24, 2013

(65) Prior Publication Data
US 2014/0184725 A1 Jul. 3, 2014

(30) Foreign Application Priority Data

Dec. 27, 2012 (CN) .......................... 2012 1 0579268

(51) Int. Cl.
H04N 7/14 (2006.01)
H04N 7/15 (2006.01)
H04N 9/31 (2006.01)

(52) U.S. Cl.
CPC ............... *H04N 7/15* (2013.01); *H04N 7/147* (2013.01); *H04N 9/3179* (2013.01); *H04N 7/142* (2013.01); *H04N 7/155* (2013.01)

(58) Field of Classification Search
CPC ...................................................... H04N 7/14
USPC ................... 348/14.01, 14.02, 14.04, 14.07
See application file for complete search history.

(56) References Cited

U.S. PATENT DOCUMENTS 6,489,934 B1   12/2002 Klausner
6,626,543 B2 *  9/2003 Derryberry ........... G06F 1/1616
                                                    353/119

(Continued)

FOREIGN PATENT DOCUMENTS

CN      101072271      11/2007
CN      102707557      10/2012
CN      102790872      11/2012

OTHER PUBLICATIONS

"Office Action of China Counterpart Application," issued on Jun. 1, 2015, p. 1-p. 9.

*Primary Examiner* — Olisa Anwah
(74) *Attorney, Agent, or Firm* — Jianq Chyun IP Office

(57) ABSTRACT

A telephone with a video function is provided, including a projection module, a network module, a video-audio capturing module, a conference module and a processor. The network module provides a network interface. The video-audio capturing module is configured to capture an image and voice of a local user, and accordingly generates local video-audio data. The conference module provides the video conference function. The processor is electrically connected to the projection module, the network module, the video-audio capturing module and the conference module. When the processor enables the video conference function of the conference module, the telephone establishes a connection with a remote apparatus through the network interface, in order to receive a remote video-audio data of a remote user from the remote apparatus, and transmit the local video-audio data to the remote apparatus. The projection module projects an image corresponding to the remote video-audio data onto a projection surface.

37 Claims, 16 Drawing Sheets

(56) References Cited

U.S. PATENT DOCUMENTS

| | | | |
|---|---|---|---|
| 7,891,826 B2 | 2/2011 | Fujinawa et al. | |
| 8,718,245 B2 * | 5/2014 | Kahn | G06F 19/3418 |
| | | | 379/93.12 |
| 8,786,664 B2 * | 7/2014 | Hornyak | H04M 1/2535 |
| | | | 348/14.03 |
| 8,947,491 B2 * | 2/2015 | Rosenberg | H04M 1/72555 |
| | | | 348/14.03 |
| 8,957,939 B1 * | 2/2015 | Ansley | H04N 21/4788 |
| | | | 348/14.04 |
| 9,007,425 B1 * | 4/2015 | Simon | H04N 7/18 |
| | | | 348/14.05 |
| 9,020,110 B1 * | 4/2015 | Baharav | H04M 15/70 |
| | | | 379/93.12 |
| 2009/0040289 A1 * | 2/2009 | Hetherington | H04N 7/142 |
| | | | 348/14.12 |
| 2011/0025818 A1 * | 2/2011 | Gallmeier | G06F 3/017 |
| | | | 348/14.07 |
| 2011/0096136 A1 * | 4/2011 | Liu | H04N 7/144 |
| | | | 348/14.07 |
| 2012/0056971 A1 * | 3/2012 | Kumar | H04M 3/567 |
| | | | 348/14.02 |
| 2012/0140017 A1 * | 6/2012 | Hong | H04N 7/144 |
| | | | 348/14.1 |
| 2012/0270600 A1 * | 10/2012 | Zelson | H04B 1/3888 |
| | | | 455/556.1 |
| 2013/0010053 A1 * | 1/2013 | Daddi | A47C 31/00 |
| | | | 348/14.08 |
| 2013/0321678 A1 * | 12/2013 | Cote | H04N 9/64 |
| | | | 348/251 |

* cited by examiner

TELEPHONE WITH VIDEO FUNCTION AND METHOD OF PERFORMING VIDEO CONFERENCE USING TELEPHONE

CROSS-REFERENCE TO RELATED APPLICATION

This application claims the priority benefit of China application serial no. 201210579268.6, filed on Dec. 27, 2012. The entirety of the above-mentioned patent application is hereby incorporated by reference herein and made a part of this specification.

BACKGROUND OF THE DISCLOSURE

1. Field of the Disclosure

The disclosure relates to a telephone and a method of performing a conferencing function using the telephone, and more particularly to a telephone with a video function and a method of performing a video conference using the telephone.

2. Description of Related Art

With rapid progress in communication technologies, people nowadays can communicate with one another no matter how far away they are from each other. Particularly, with the popularity of high-bandwidth internet access, a video conference system capable of transmitting image and voice tends to become the mainstream in the development of remote communication methods.

Since a computer is characterized by high peripheral compatibility, the computer plays a leading role in the common videoconferencing system, and the computer may be connected with a video camera and a microphone to establish an operational environment for performing a video conference. However, the assembly of said components and the software configuration are rather time-consuming. From another perspective, if a specific host plays a leading role in the common video conference system, the connecting ports of the peripheral equipment including the video camera and the microphone are required to comply with the specification of the specific host, which may lead to difficulty in setting up the video conference system.

Besides, a conventional video conference system usually displays the image of a remote user via a flat panel display. Unfortunately, the image displayed in a display may be restricted to the size thereof. Moreover, due to the bulkiness of the flat panel display, the video conference system is usually configured in a conference room and cannot be moved at will.

According to the related art, a compact and lightweight mobile phone having a mechanism for displaying received wireless data in its original format of the page as sent from an original source is provided, and each original page may be viewed as a whole page instead of a series of partial pages. The mobile phone also allows the display of received wireless visual data with characters in their true original size for the convenience of reading and use. The mechanism for displaying the data may also be applied to display the data transmitted by the mobile phone.

In another related art, a projection apparatus having an image creation unit and an illumination unit is provided. The image creation unit projects image information on a screen and includes a plurality of image elements that construct an image pattern corresponding to the image information. The illumination unit herein refers to a plurality of light emitting devices disposed on a vertical plane with respect to an optical axis which passes through a center of the created image. These light emitting devices are at equal distances from the optical axis but are in different locations.

In another related art, a projection apparatus and a portable mobile phone are provided. The projection apparatus includes a projecting unit, an image capturing unit, and a single driver source. The projecting unit includes a light source and a projection lens whose focal point is variable, and the projecting unit projects an image on a projection surface with a light emitted from the light source that passes through a projection lens. The image capturing unit includes a photographic lens whose focal point is variable, and the image capturing unit captures an image of an object with an external light that passes through the photographic lens. The single drive source generates a drive force to change both the focal position of the projection lens and the focal position of the photographic lens.

SUMMARY OF THE DISCLOSURE

The disclosure provides a telephone with a video function and a method of performing a video conference using the telephone; the telephone is capable of integrating a video conference function thereinto and a video conference with a remote apparatus may be directly performed via the telephone.

Other advantages of the invention may be further comprehended by reading the technical features described in the invention as follows.

In order to achieve one or a part of or all of the above advantages or other advantages, an embodiment of the disclosure provides a telephone with a video function, including a projection module, a network module, a video-audio capturing module, a conference module, and a processor. The network module provides a network interface. The video-audio capturing module is electrically connected to the network module for capturing the image and voice of a local user, and accordingly generates local video-audio data. The conference module provides the video conference function. The processor is electrically connected to the projection module, the network module, the video-audio capturing module and the conference module. When the processor enables the video conference function of the conference module, the telephone establishes a connection with the remote apparatus via the network interface so as to receive the remote video-audio data of a remote user from the remote apparatus, and transmit the local video-audio data to the remote apparatus, wherein the projection module is controlled by the processor so as to project an image corresponding to the remote video-audio data onto a projection surface.

In order to achieve one or a part of or all of the above advantages or other advantages, an embodiment of the disclosure provides a method of performing a video conference using a telephone, including the following steps: enabling the video conference function of the telephone; capturing the image and voice of the local user and generating the local video-audio data accordingly; establishing a connection with the remote apparatus via a network interface; receiving a remote video-audio data of a remote user from a remote apparatus and transmitting the local video-audio data to the remote apparatus; and projecting the image corresponding to the remote video-audio data onto the projection surface.

In an embodiment of the disclosure, the local video-audio data includes local video data and local audio data; the remote video-audio data includes remote video data and remote audio data.

In an embodiment of the disclosure, the telephone further includes an image processing module and an audio processing module. The image processing module is electrically connected to the processor for performing an image processing to at least one of the local video data and remote video data. The audio processing module is electrically connected to the processor for performing audio processing to the remote audio data.

In an embodiment of the disclosure, the projection module projects onto the projection surface according to the remote video data processed by the image processing module. Moreover, the image processing module blends the local video data and the remote video data into an integrated image, and the projection module projects the integrated image onto the projection surface.

In an embodiment of the disclosure, the image processing module captures a human portrait portion from the local video data and the remote video data and pastes the captured human portrait portion onto a background pattern to compose the integrated image.

In an embodiment of the disclosure, the telephone further includes an audio output module. The audio output module is electrically connected to the audio processing module for transforming the processed remote audio data into a voice output.

In an embodiment of the disclosure, the remote video-audio data includes remote video data and remote audio data, and the telephone further includes a video processing module. The video processing module is electrically connected to the network module and the image processing module for transforming the remote video data into a format projectable by the telephone.

In an embodiment of the disclosure, the image processing module is included in the processor.

In an embodiment of the disclosure, the conference module includes a memory, which includes a communication software. The processor enables the video conference function by executing the communication software.

In an embodiment of the disclosure, the remote video-audio data includes remote video data and remote audio data, and the telephone further includes a video decompression module and an audio decompression module. The video decompression module is electrically connected to the conference module and the network module for performing the image processing to the remote video data, and outputting the processed remote video data to the conference module. The audio decompression module is electrically connected to the conference module and the network module for performing the audio processing to the remote audio data, and outputting the processed remote audio data to the conference module. Wherein, the video decompression module and the audio decompression module are included in the conference module.

In an embodiment of the disclosure, the remote video-audio data includes remote video data and remote audio data, and the telephone further includes a video processing module, a video decompression module, and an audio decompression module. The video processing module is electrically connected to the image processing module. The video decompression module is electrically connected to the video processing module and the network module for performing the image processing to the remote video data, and outputting the processed remote video data to the video processing module. The audio decompression module is electrically connected to the audio processing module and the network module for performing the audio processing to the remote audio data, and outputting the processed remote audio data to the audio processing module. The local video-audio data includes local video data and local audio data, and the video-audio capturing module includes an image capturing module and an audio capturing module. The image capturing module captures the image of the local user and generates local video data accordingly. The audio capturing module captures the voice of the local user and generates local audio data accordingly.

In an embodiment of the disclosure, the image capturing module has a field of view of at least 90 degrees. The image capturing module includes a lens unit, a first shading unit, a second shading unit and an image adjustment unit. The lens unit having a field of view of 180 degrees and outputting a captured image. The first shading unit is disposed on an optical axis of the lens unit. The second shading unit extending from the first shading unit to an edge of the lens unit, wherein the second shading unit is disposed between the lens unit and the projection surface where the image projected is onto, and a first opening angle of the second shading unit with respect to the optical axis covers a second opening angle of the image projected onto the projection surface with respect to the optical axis. The image adjustment unit coupled to the lens unit to filter a portion of the captured image corresponding to the first shading unit and the second shading unit, straighten edges of an unfiltered portion of the local video data to generate a reference image, and consider a rectangular image as the local video data, wherein the rectangular image is generated by cutting or affine-transforming the reference image. Here, the lens unit is a fish-eye lens. The first shading unit and the second shading unit are thin films or hard lids. The second shading unit completely covers the first opening angle.

In an embodiment of the disclosure, the telephone further includes a fill-in light source disposed adjacent to the image capturing module and configured to compensate the light insufficient for the local user. The telephone further includes a casing which has a front side, a rear side, and a top side. The projection module further includes a casing which has a front side, a rear side, and a top side. The projection module projects an image onto the projection surface, wherein the image capturing module is disposed on the top side of the casing, and an image capturing direction of the image capturing module is not overlapped with an image projection direction of the projection module.

In an embodiment of the disclosure, the remote video-audio data includes remote video data and remote audio data, the image capturing module has a field of view of 180 degrees, and the telephone further includes an audio processing module, a video-audio recording module, and a storage module. The audio processing module is electrically connected to the processor for performing the audio processing to the remote audio data. The video-audio recording module is electrically connected to the processor, the image capturing module, the audio capturing module, and the audio processing module. The storage module is electrically connected to the video-audio recording module. The video-audio recording module records the image being projected onto the projection surface, the remote audio data, and the local audio data, and stores the image on the projection surface, the remote audio data, and the local audio data in the storage module. The video-audio capturing module further includes a video compression module and an audio compression module. The video compression module is electrically connected to the image capturing module and the network module for performing the image processing to the local video data, and outputting the processed local video data to the network module. The audio compression module is electrically connected to the audio capturing module and the network module for performing the audio processing to the local audio data, and outputting the processed local audio data to the network module. The conference module includes a memory which includes a communication software. The processor enables the video conference function by executing the communication software. When the communication software is executed, the telephone is connected to a first server via a network interface for performing an authentication procedure. After the authentication procedure is approved, the communication software provides the local user with a permission to send a request for video conference to the remote user. When the local user sends the request for video conference, the processor enables the video-audio capturing module. When the remote user confirms the request for video conference, the communication software establishes a connection between the telephone and the remote apparatus on the first server. When the remote user confirms the request for video conference, the communication software establishes a connection between the telephone and the remote apparatus on a second server.

In an embodiment of the disclosure, the local video-audio data includes local video data and local audio data, and the telephone further includes a video-audio recording module and a storage module, wherein the video-audio recording module is electrically connected to the processor for recording the local audio data and the remote video-audio data, and storing the local audio data and the remote video-audio data in the storage module which is electrically connected to the video-audio recording module.

In an embodiment of the disclosure, the local video-audio data includes local video data and local audio data, and the telephone further includes a video-audio recording module and a storage module, wherein the video-audio recording module is electrically connected to the conference module for recording the remote video-audio data and the local video data, and storing the remote video-audio data and the local audio data in the storage module which is electrically connected to the video-audio recording module.

In an embodiment of the disclosure, the network interface includes at least one of a wired network interface and a wireless network interface.

In an embodiment of the disclosure, the method of performing the video conference using the telephone includes the following steps: enabling the video conference function of the telephone; capturing the image and voice of the local user and generating the local video-audio data accordingly; establishing a connection with the remote apparatus via the network interface; receiving the remote video-audio data of the remote user from the remote apparatus and transmitting the local video-audio data to the remote apparatus; and projecting the image corresponding to the remote video-audio data onto the projection surface. The local video-audio data includes local video data and local audio data. The steps of capturing the image and voice of the local user and generating the local video-audio data accordingly include: capturing the image of the local user and generating the local video data accordingly, and capturing the voice of the local user and generating the local audio data accordingly.

In the method of performing the video conference using the telephone of an embodiment of the disclosure, the steps of capturing the image of the local user and generating the local video data accordingly includes: filtering a portion of the image of the local user corresponding to a shading unit; straightening edges of an unfiltered portion of the image of the local user to generate a reference image; considering a rectangular image as the local video data, wherein the rectangular image is generated by cutting or affine-transforming the reference image.

In the method of performing the video conference using the telephone of an embodiment of the disclosure, the local video-audio data includes local video data and local audio data, and the method further includes the following steps: performing the image processing to at least one of the local video data the remote video data, and performing the audio processing to at least one of the local audio data and the remote audio data.

In the method of performing a video conference using the telephone of an embodiment of the disclosure, the method further includes the following step: projecting the image of the remote user onto the projection surface according to the processed remote video data.

In the method of performing a video conference using the telephone of an embodiment of the disclosure, the method further includes the following step: projecting an integrated image onto the projection surface according to the processed local video data and the remote video data. The method further includes the following step: capturing a human portrait portion from the local video data and the remote video data; and pasting the captured human portrait portion onto a background pattern to compose the integrated image.

In the method of performing a video conference using the telephone of an embodiment of the disclosure, the method further includes the following step: transforming the processed remote audio data into voice output.

In the method of performing a video conference using the telephone of an embodiment of the disclosure, the steps of enabling the video conference function of the telephone include: executing the communication software; connecting to the first server via the network interface; performing the authentication procedure; determining whether the authentication procedure is approved; and when the authentication procedure is approved, providing the local user with the permission to send a request for video conference to the remote user. After the authentication procedure is approved, the steps of enabling the video conference function of the telephone further include: determining whether the local user sends the request for video conference; when the local user sends the request for video conference, starting to capture the image and voice of the local user and determining whether the remote user confirms the request for video conference; and when the remote user confirms the request for video conference, establishing the connection between the telephone and the remote apparatus on the first server.

In the method of performing a video conference using the telephone of an embodiment of the disclosure, after the authentication procedure is approved, the steps of enabling the video conference function of the telephone further include: determining whether the local user sends the request for video conference; when the local user sends the request for video conference, starting to capture the image and voice of the local user and determining whether the remote user confirms the request for video conference; and when the remote user confirms the request for video conference, establishing the connection between the telephone and the remote apparatus on the second server.

In the method of performing a video conference using the telephone of an embodiment of the disclosure, after the video conference function of the telephone is enabled, a video-audio recording is enabled.

In the method of performing a video conference using the telephone of an embodiment of the disclosure, the local video-audio data includes local video data and local audio data, and the method further includes the following steps: receiving and recording a remote video-audio data of the remote user transmitted by a network module and a local audio data, and storing the remote video-audio data of the remote user and the local audio data.

In the method of performing a video conference using the telephone of an embodiment of the disclosure, the local video-audio data includes local video data and local audio data, the remote video-audio data includes remote video data and remote audio data, and the method further includes the following steps: after receiving an image projected onto the projection surface and captured by a front side image capturing module, the local audio data captured by the audio capturing module, and the remote audio data outputted by the audio processing module, storing the projected image, local audio data and the remote audio data in the storage module.

In the method of performing a video conference using the telephone of an embodiment of the disclosure, the following steps are further included: receiving and recording the local video-audio data of the local user captured by a video-audio capturing module as well as the remote video-audio data of the remote user transmitted by a network module, and storing the local video-audio data and the remote video-audio data.

In order to make the aforementioned features and advantages of the disclosure more comprehensible, embodiments accompanying figures are described in detail below.

BRIEF DESCRIPTION OF THE DRAWINGS

FIG. 3A-2 is a schematic view of performing a video conference using a telephone in another embodiment of the disclosure.

DESCRIPTION OF EMBODIMENTS

It is to be understood that both the foregoing and other detailed descriptions, features and advantages are intended to be described more comprehensively by providing a preferred embodiment accompanied with figures hereinafter. The language used to describe the directions such as up, down, left, right, front, back or the like in the embodiments is defined with reference of the directions in the accompanying drawings, and should be regarded in an illustrative rather than in a restrictive sense. Thus, the language used to describe the directions is not intended to limit the scope of the disclosure.

Figure 1A:
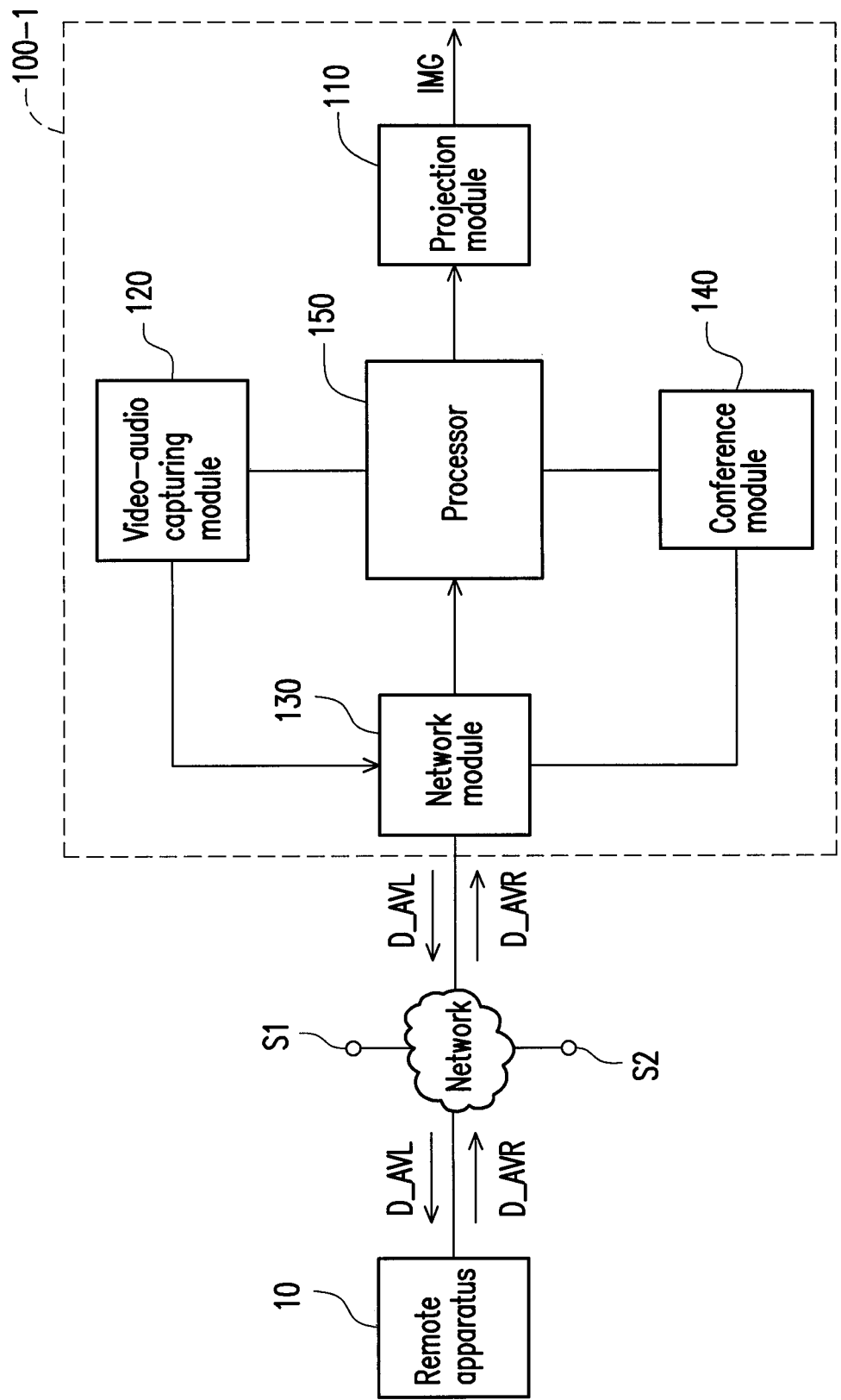
FIG. 1A is a schematic view of a telephone with a video function in an embodiment of the disclosure.

FIG. 1A is a schematic view of a telephone with a video function in an embodiment of the disclosure. Referring to FIG. 1A, the telephone 100-1 includes a projection module 110, a video-audio capturing module 120, a network module 130, a conference module 140, and a processor 150. The projection module 110 projects image(s) onto a projection surface (not shown) in which the projection surface is an area suitable for image(s) to be projected thereon such as a projection screen or any smooth wall surface or desk surface. In an embodiment, the projection module 110 implements the function of projecting the image(s) onto the projection surface by a structure (not shown) including a light source, a light valve and a projection lens. For example, a light source in the projection module 110 is capable of providing an illumination beam so that a light valve configured in a transmission path of the illumination beam is capable of transforming the illumination beam into an image beam corresponding to an image IMG. Then, the image IMG is projected onto the projection surface via the projection lens configured in a transmission path of the image beam. The light source is, for example, a solid state light source (such as light emitting diode) or a high intensity discharge (HID) light source; however, the disclosure is not limited thereto. The light valve is, for example, a digital micromirror device (DMD), liquid crystal on silicon (LCoS), or a liquid crystal panel; however, the disclosure is not limited thereto.

The video-audio capturing module 120 is electrically connected to the processor 150 and the network module 130, wherein the video-audio capturing module 120 is configured for capturing the image and voice data of the local user and accordingly generates the local video-audio data D_AVL.

The network module 130 provides a network interface so that the telephone 100-1 is capable of being connected to the Internet or local area network. The network interface may be a wired network interface, e.g., Ethernet, fast Ethernet (or referred to as 100BASE-T), and gigabit Ethernet, or a wireless network interface that supports the wireless communication protocol such as 3G (Third Generation Mobile Telecommunications), WiFi (Wireless Fidelity), long term evolution (LTE), Bluetooth, 802.11a, 802.11b, 802.11g, 802.11x, and etc. The network module 130 is, for example, a wired network card, a wireless network card, a wireless network adapter, a 3G communication chip, or a 4G communication chip.

The conference module 140 may provide a video conference function, which may be implemented in the form of a software or firmware. In other words, the conference module 140 may be, for example, a memory storing communication software, or a controller with an embedded firmware; the disclosure is not limited thereto. When the conference module 140 enables the video conference function, the conference module 140 drives the processor 150 so that the processor 150 is capable of controlling the video-audio capturing module 120 to capture the local video-audio data D_AVL to transmit the local video-audio data D_AVL to a remote apparatus 10 via the network module 130.

The processor 150 is electrically connected to the projection module 110, the video-audio capturing module 120, the network module 130, and the conference module 140 to control the operation of each module. The video-audio capturing module 120 may be assembled by an individual image capturing module and an individual audio capturing module respectively. The image capturing module is, for example, a video camera, and the audio capturing module is, for example, a microphone, although the video-audio capturing module 120 may also be a video camera with an image capturing function and audio capturing function.

In the embodiment, when the local user controls the telephone 100-1 to perform the video conference function of the conference module 140, the telephone 100-1 may establish a connection with the remote apparatus 10 via a network (may be the Internet or local area network) through the network interface of the network module 130, thereby receiving a remote video-audio data D_AVR of the remote user from the remote apparatus 10, and transmitting the local video-audio data D_AVL to the remote apparatus 10. Therefore, the telephone 100-1 may use the projection module 110 to project the image IMG corresponding to the remote video-audio data D_AVR onto the projection surface according to the received remote video-audio data D_AVR in which the remote user is located at a location where the remote user cannot see the image IMG projected onto the projection surface by the local telephone 100-1. The remote apparatus 10 may be a telephone with the same structure and functions as the telephone 100-1, or an electronic apparatus with a network function and a video-audio capturing function such as a conventional desktop computer, a notebook computer, a smart mobile phone, or a smart TV. The type of the remote apparatus 10 provides not limitation to the scope of the disclosure.

Figure 1B:
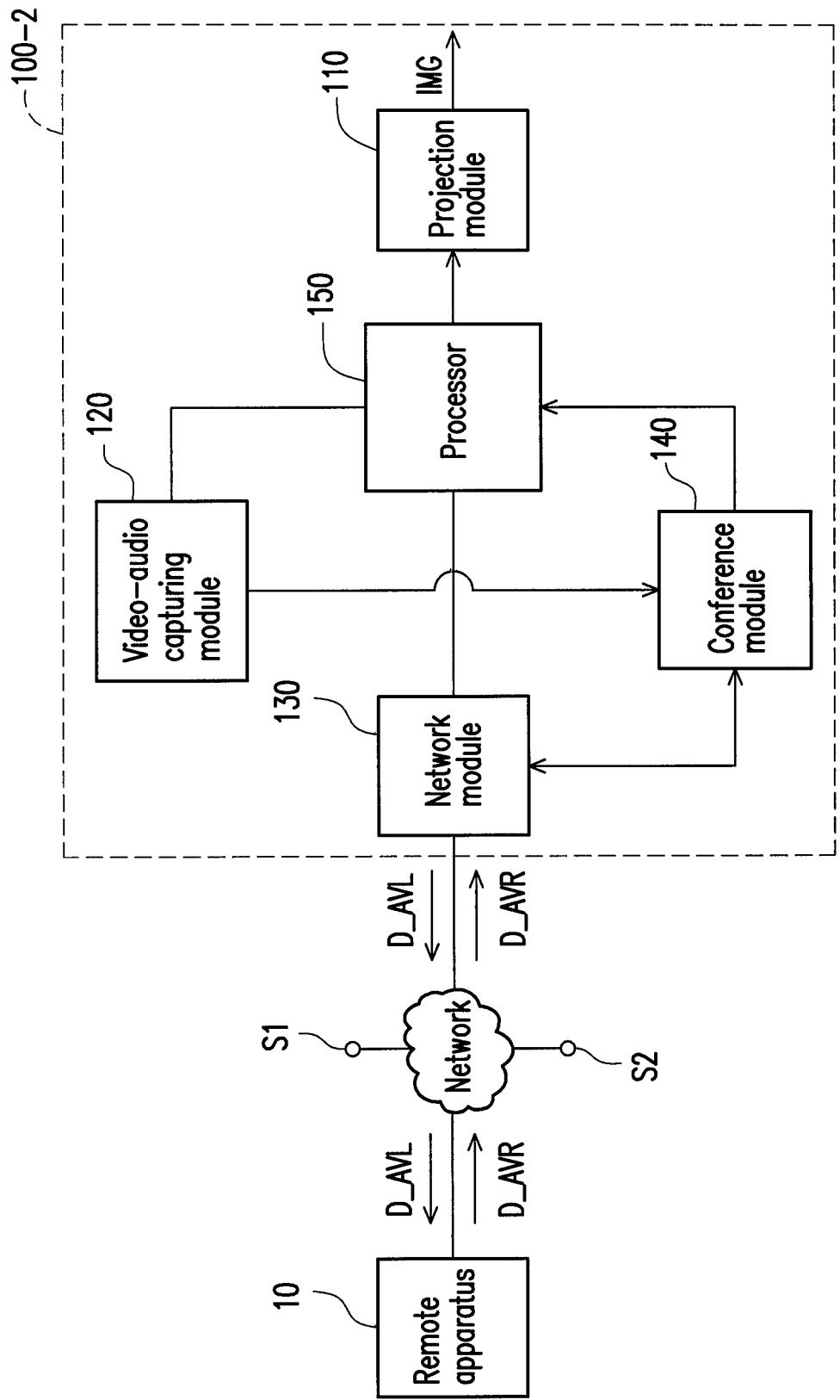
FIG. 1B is a schematic view of a telephone with a video function in another embodiment of the disclosure.

FIG. 1B is a schematic view of a telephone in another embodiment of the disclosure. A telephone 100-2 in FIG. 1B and the telephone 100-1 in FIG. 1A are substantially the same; the difference between them lies in that, in the embodiment of FIG. 1B, the local video-audio data D_AVL generated by the image and voice data of the local user and captured by the video-audio capturing module 120 is transmitted to the network module 130 by the conference module 140 and then provided to the remote apparatus 10 via the network. After the remote video-audio data D_AVR is transmitted to the conference module 140 via the network module 130, the image IMG corresponding to the remote video-audio data D_AVR is then projected onto the projection surface by the projection module 110 via the processor 150.

In comparison with a conventional video conference system, in the foregoing embodiments, the video-audio capturing function and network connection function are combined into the telephone 100-1 or telephone 100-2 and controlled by the processor 150, such that the user can establish an operation environment for a video conference system without the complicated accessories-assembling process, and does not need to be concerned about the compatibility problem between each video-audio capturing apparatus (such as a video camera and a microphone) and the video conference system, thereby making it a lot more convenient to be used.

In addition, since the telephone 100-1 and telephone 100-2 do not need a display to display images, instead, they are capable of projecting an image onto any suitable projection surfaces, the telephone 100-1 and telephone 100-2 are smaller and more portable in comparison with a conventional smart TV with a video conference function. Moreover, since the size of the projection screen is not restricted to the size of a display, the telephone 100-1 and telephone 100-2 may adaptively adjust the size of a projection screen based on the user's need. For example, when there are more people participating in a conference, a larger image may be projected to be seen clearly by the participants. Moreover, if the throw ratio is properly adjusted, the size of the projected human portrait is substantially the same as or similar to the real size. Here, the throw ratio may be calculated in consideration of the focal length of the projection lens and the dimension of the light valve (e.g., an LCD panel, an LCoS display panel, or a DLP display panel). Therefore, the telephone 100-1 and telephone 100-2 have greater flexibility for usage in comparison with a conventional video conference system and are less likely to be restricted to the location and space.

In addition, the telephone 100-1 and telephone 100-2 further include an input apparatus (not shown). The local user can use the input apparatus to operate the telephone 100-1 and 100-2. The input apparatus may be, for example, a keyboard, a wireless keyboard, a touch panel or a remote controller that is built in or externally connected to the telephone 100-1 and telephone 100-2.

Figure 2A:
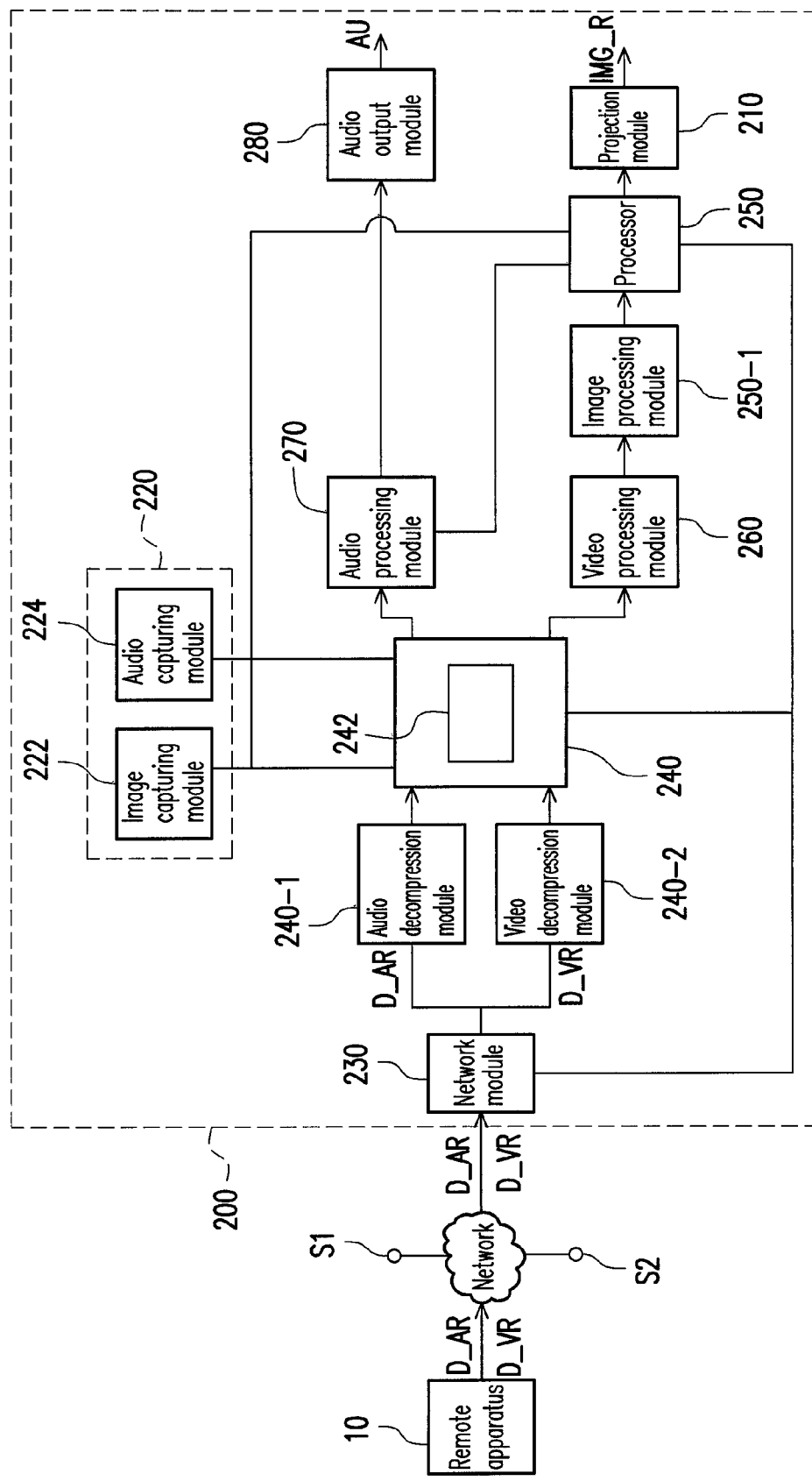
FIG. 2A is a schematic view of a portion of a telephone in an embodiment of the disclosure.

FIG. 2A is a schematic view of a portion of a telephone in an embodiment of the disclosure, describing a transmission process in which the local telephone projects an image and plays voice after receiving the remote video-audio data of the remote user (including a remote audio data D_AR and a remote video data D_VR). Referring to FIG. 2A, the telephone 200 includes a projection module 210, a network module 230, an audio decompression module 240-1, a video decompression module 240-2, a conference module 240, an image processing module 250-1, a processor 250, a video processing module 260, an audio processing module 270, an audio output module 280, and a video-audio capturing module 220. The video-audio capturing module 220 is electrically connected to the processor 250 and the conference module 240. The video-audio capturing module 220 includes an image capturing module 222 and an audio capturing module 224. In the embodiment, the conference module 240 further has a memory in which a communication software 242 is stored for implementation; however, the disclosure is not limited thereto. The projection module 210 and the network module 230 are the same as the foregoing projection module 110 and the network module 130 shown in FIGS. 1A-1B; therefore no further description is incorporated herein.

In the embodiment, for smoothly maintaining a video conference, the remote apparatus 10 and the telephone 200 use an image compression technique to reduce the quantity of original video data for which to be transmitted and stored more easily. Therefore, the video decompression module 240-2 in the telephone 200 performs an image processing process in which the image is decompressed, thereby restoring the compressed remote video data D_VR. The image processing may be performed by selecting various video encoding algorithms such as H.261, H.262, H.263, H.264, MJPEG, WMV, MPEG, VP7, or VP8, and etc. for image compression according to the requirement for the image quality and fluency; the disclosure is not limited thereto. The video decompression module 240-2 such as a video decoder, a video decoding chip or a video decoding circuit may perform decoding/decompression according to the corresponding compression format of the video data. The video processing module 260 electrically connected to the network module 230 and the processor 250 is configured to perform a video processing to the remote video data D_VR, for example, a format transformation processing which can transform the remote video data D_VR into a format that is projectable by the projection module 210, when receiving the remote video data D_VR; however, the disclosure is not limited to the function. The video processing module 260 is, for example, a video processing chip. In the embodiment, the video processing module 260 is, for example, electrically connected to the conference module 240 and the processor 250.

The format-transformed remote video data D_VR is transmitted to the image processing module 250-1 that is electrically connected to the video processing module 260. The image processing module 250-1 is, for example, an image processing chip or an image processing circuit adaptable for adjusting the projection size and projection resolution of the format-transformed remote video data D_VR, or for performing image blending to the remote video data D_VR transmitted by the video processing module 260 and the local video data, which will be described in details in the following paragraphs. In other embodiments, the image processing module 250-1 has the function of adjusting the size and resolution of the projected image as well as image blending function. In addition, the image processing module 250-1 is not necessarily an independent module, and may be included in the processor 250. That is, the processor 250 may also have the function that the image processing module 250-1 has.

The processor 250 transmits the processed remote video data D_VR to the projection module 210 to project an image IMG_R of the remote user USR_R.

Similar to the video decompression module 240-2, the audio decompression module 240-1 is configured to perform an audio processing process in which the audio is decompressed, thereby restoring a compressed remote audio data D_AR. The audio processing may be performed by selecting various audio encoding algorithms such as G.711, G.722, G723, G.726, G.728, WMA, AAC, or ILBC, and etc. for audio compression according to the requirement for the voice quality and fluency; the disclosure is not limited thereto. The audio decompression module 240-1, such as an audio decoder, an audio decoding chip, or an audio decoding circuit, is capable of performing decoding/decompression according to the corresponding compression format of the audio data. The audio processing module 270, such as an audio processing chip, is electrically connected to the processor 250 for performing audio processing, such as adjusting the volume of voice output and voice quality, to the remote audio data D_AR when receiving the remote audio data D_AR; the disclosure is not limited thereto. The audio output module 280 is electrically connected to the audio processing module 270 for transforming the processed remote audio data D_AR into a voice output AU corresponding to the voice of the remote user USR_R. Specifically, the audio output module 280 may be, for example, a speaker built in or externally connected to the telephone 200.

In another embodiment of the disclosure, the audio decompression module 240-1 and the video decompression module 240-2 may be disposed in the conference module 240. The network module 230 may directly transmit the remote audio data D_AR and the remote video data D_VR to the conference module 240 having an audio and video decompression function for performing decompression.

Figure 2B:
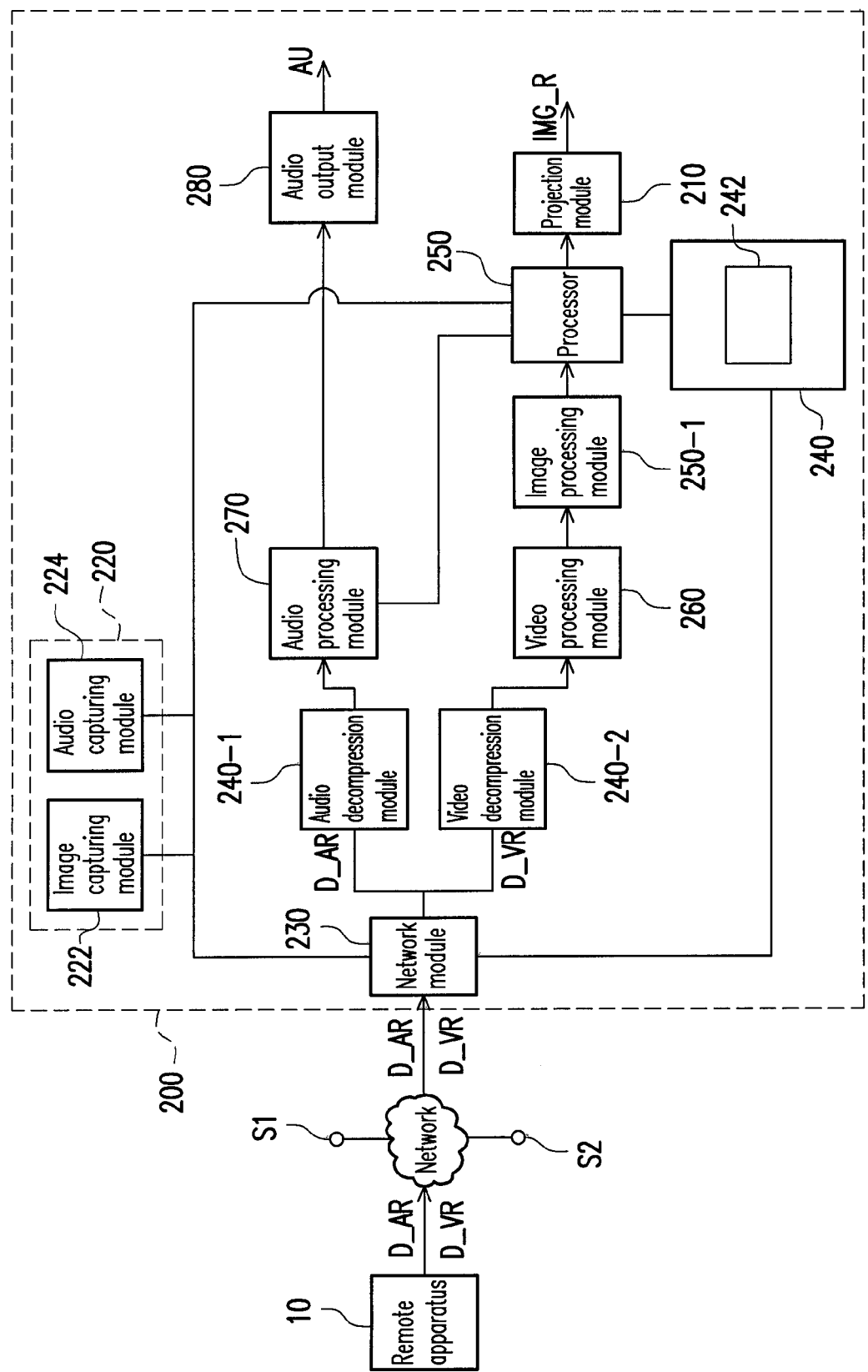
FIG. 2B is a schematic view of a portion of a telephone in another embodiment of the disclosure.

FIG. 2B is a schematic view of a portion of a telephone in an embodiment of the disclosure and is similar to FIG. 2A; the difference between them lies in that the video decompression module 240-2 is electrically connected to the network module 230 and the video processing module 260. The audio decompression module 240-1 is electrically connected to the network module 230 and the audio processing module 270. The processor 250 is electrically connected to the conference module 240. The telephone 200 receives the remote video data D_VR and the remote audio data D_AR via the network module 230 after the conference module 240 is enabled. The remote video data D_VR is transmitted to the video decompression module 240-2, after processed with decompression, and then directly transmitted to the video processing module 260 to perform the image processing, for example, transformed the remote video data D_VR into the format projectable by the telephone 200; thereafter, the remote video data D_VR is again transmitted to the image processing module 250-1 for performing image processing such as adjusting the projection size and resolution of the format-transformed remote video data D_VR or other image processing, and finally the image IMG_R corresponding to the remote video-audio data D_AVR is projected onto the projection surface by the projection module 210 via the processor 250. The remote audio data D_AR is transmitted to the audio decompression module 240-1, after being processed with decompression, and then directly transmitted to the audio processing module 270 for performing the audio processing, such as adjusting the volume and quality of the voice output. In addition, the video-audio capturing module 220 is electrically connected to the processor 250 and network module 230. The description regarding the function and structure of the audio decompression module 240-1, video decompression module 240-2, video processing module 260, and audio processing module 270 are already provided in the previous paragraphs, and therefore no further description is incorporated herein.

It should be noted that although it is not shown in FIG. 2A or 2B, in other embodiments, the audio decompression module 240-1 and the audio processing module 270 may be manufactured into a single module/circuit or chip via the manner of an integrated circuit manufacturing process; the video decompression module 240-2 and the video processing module 260 may be manufactured into a single module/circuit or chip.

Figure 2C:
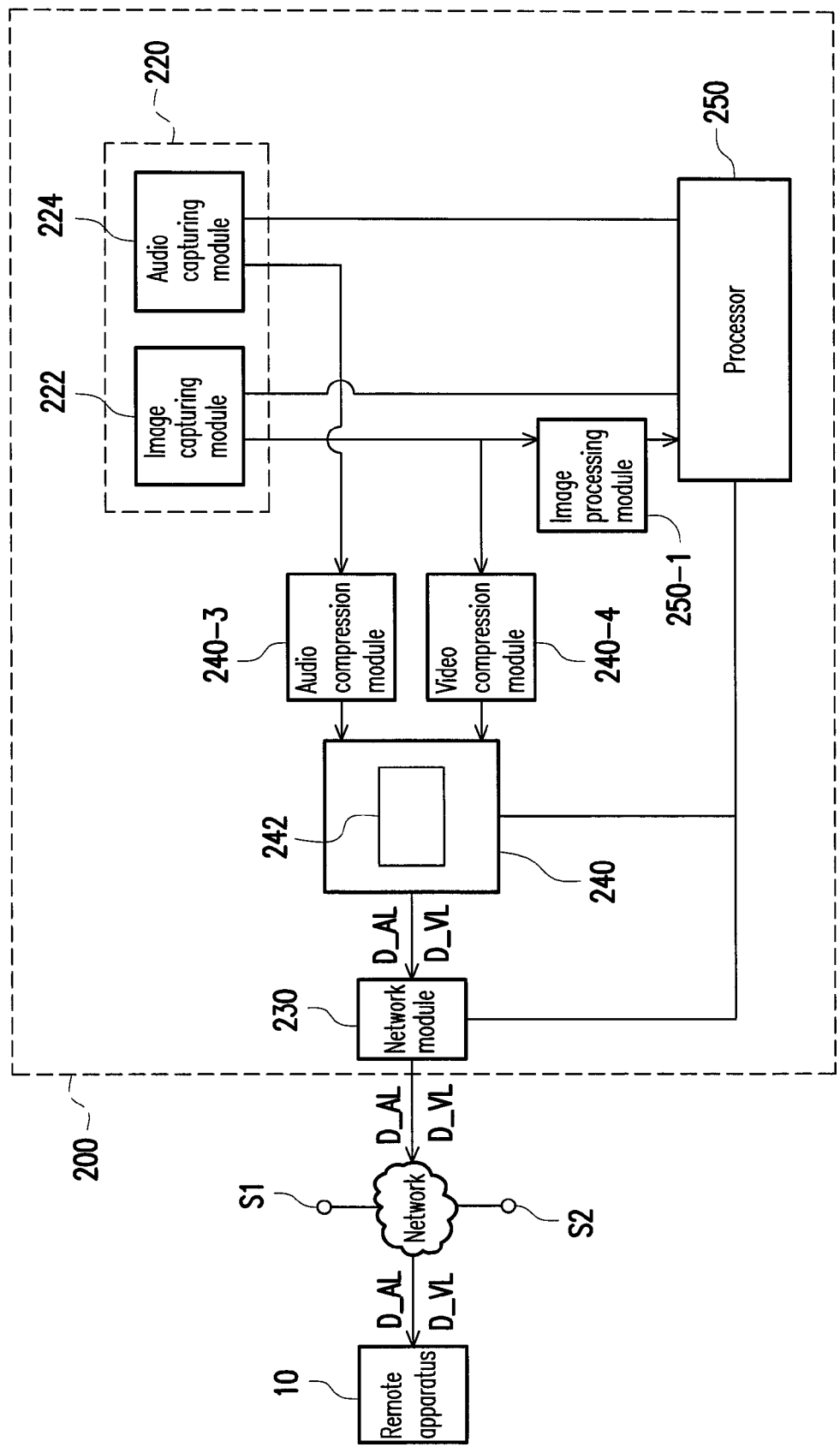
FIG. 2C is a schematic view of a portion of a telephone in another embodiment of the disclosure.

FIG. 2C is a schematic view of a portion of a telephone in an embodiment of the disclosure, describing a process which the local telephone 200 transmits the local video data D_VL and the local audio data D_AL to the remote apparatus 10 via the network module 230 after the local telephone 200 generates a local video data D_VL and a local audio data D_AL using the video-audio capturing module 220. In the video-audio capturing module 220, the image capturing module 222 and the audio capturing module 224 respectively capture the image and voice of the local user, and respectively generate the local video data D_VL and the local audio data D_AL accordingly. In an embodiment, the image capturing module 222 captures the image of the local user and then transmits the image of the local user to the image processor 250-1 for performing image blending with the remote video data D_VR. The specific description is incorporated in the following paragraphs.

The scope of a field of view of the image capturing module 222 is at least 90 degrees. In an embodiment, the image capturing module 222 may capture an all-view image of the local user by using a video camera with an all-view image capturing function; alternatively, the image capturing module 222 may include an image processing software which may compose the image captured by the image capturing module 222 into an all-view image via a software processing; the disclosure is not limited thereto. On the other hand, the audio capturing module 224 may be, for example, a microphone built in or externally connected to the telephone 200. The microphone is capable of transmitting the local audio data D_AL to an audio compression module 240-3.

In addition, a video compression module 240-4 is electrically connected to the image capturing module 222 and the network module 230. The video compression module 240-4 is, for example, a video encoder, a video encoding chip, or a video encoding circuit adaptable for performing the format transformation to the local video data D_VL so as to comply with the video format corresponding to the remote apparatus 10, the encoding algorithm for which is the same as that described above and no further relevant description is incorporated herein. Specifically, the video compression module 240-4 is configured between the image capturing module 222 and the conference module 240. The video compression module 240-4 is configured to execute the image processing process in which the image is compressed. The video compression module 240-4 outputs the compressed local video data D_VL to the network module 230 when the video conference function is enabled, and transmits the compressed local video data D_VL to the remote apparatus 10 via the network interface of the network module 230.

Similar to the video compression module 240-4, the audio compression module 240-3 is electrically connected to the audio capturing module 224 and the network module 230. The audio compression module 240-3 is, for example, an audio encoder, an audio encoding chip, or an audio encoding circuit for transforming the audio format of the local audio data D_AL so at to comply with the audio format corresponding to the remote apparatus 10, the encoding algorithm for which is the same as that described above and no further relevant description is incorporated herein. Specifically, the audio compression module 240-3 is configured between the audio capturing module 224 and the conference module 240. The audio compression module 240-3 is configured to execute the audio processing process in which the audio is compressed. The audio compression module 240-3 outputs the compressed local audio data D_AL to the network module 230 when the video conference function is enabled, and transmits the compressed local audio data D_VL to the remote apparatus 10 via the network interface of the network module 230.

On the other hand, the video compression module 240-4 and the audio compression module 240-3 may be combined with the conference module 240; that is, the video compression module 240-4 and the audio compression module 240-3 are included in the conference module 240, thereby simplifying the circuit design which is therefore relatively simpler. In other embodiment, in FIGS. 2A-2C, the audio decompression module 240-1, video decompression module 240-2, the video compression module 240-4 and the audio compression module 240-3 may be combined with the conference module 240, thereby simplifying the circuit design which is therefore relatively simpler.

In the foregoing telephone 200, the various video processing and audio processing process may be adopted for processing the local video-audio data D-VL and D_AL as well as the remote video-audio data D_VR and D_AR according to the design requirement. The compression/decompression processing process for the video data and audio data described herein is simply as an example; the disclosure is not limited thereto.

In the embodiment, the local user can operate the telephone 200 so that the processor 250 executes the communication software 242 to enable the video conference function. The communication software 242 may be an instant communication software such as Skype, MSN, Yahoo messenger, ICQ messenger, Google Talk, or etc.; the disclosure is not limited thereto. Specifically, the telephone 200 further includes an input apparatus (not shown), by which the local user can operate the telephone 200. The input apparatus may be, for example, a keyboard, a wireless keyboard, a touch panel, or a remote controller embedded in or externally connected to the telephone 200. In addition, the telephone 200 further includes an on-screen display (OSD) interface (not shown). The telephone 200 is capable of projecting the OSD interface onto the projection surface such that the local user can use the input apparatus to operate the control functions shown in the OSD interface, thereby adjusting the image setting (such as adjusting the size and contrast of the projection screen), adjusting the audio setting (such as adjusting the volume of the voice output) and executing the communication software 242. The OSD interface may be in the form of a menu or a keyboard according to the operation requirement of the local user; the disclosure is not limited thereto.

Referring to FIGS. 2A, 2C and 3A-1, FIG. 3A-1 is a schematic view of performing a video conference using a telephone in FIGS. 2A and 2C. When the communication software 242 is executed, the telephone 200 is connected to a first server S1 for performing an authentication procedure via the network interface (for example, the local user is requested to enter an account and a password) to authenticate the identity of a local user USR_L. The local user USR_L may use the input apparatus and/or the OSD interface of the telephone 200 to enter a corresponding information for performing the authentication procedure. When the authentication procedure of the local user USR_L is approved, the communication software 242 allows the telephone 200 to log onto the first server S1, and provides the local user USR_L with permission to request for video conference. At this time, the local user USR_L can send a request for video conference to any one of the remote users USR_R who is online.

In the embodiment, the processor 250 enables the video-audio capturing module 220 when the local user USR_L sends a request for video conference to a remote user USR_R, so that the video-audio capturing module 220 starts to capture the image and voice of the local user USR_L, and the processor 250 or the communication software 242 will keep determining whether the remote user USR_R confirms the request for video conference sent by the local user USR_L. When the remote user USR_R confirms the request for video conference, the communication software 242 establishes a connection between the telephone 200 and the remote apparatus 10 on the first server S1 to receive the remote video data D_VR and remote audio data DAR of the remote user USR_R, and transmit the local video data D_VL and the local audio data D_AL to the remote apparatus 10.

After the connection between the telephone 200 and the remote apparatus 10 is established, the video processing module 260, the image processing module 250-1, and the audio processing module 270 respectively perform the image processing and audio processing to the remote video data D_VR and the remote audio data D_AR, such that the projection module 210 projects the image IMG_R of the remote user USR_R onto the projection surface according to the processed remote video data D_VR, and transforms the processed remote audio data DAR into the voice output AU of the remote user USR_R. On the other hand, the remote apparatus 10 may also output the image and voice of the local user USR_L synchronously on the remote apparatus 10 according to the received local video data D_VL and the local audio data D_AL.

The connection between the telephone 200 and the remote apparatus 10 is not restrictively established on the first server S1. In other embodiments, the telephone 200 and the remote apparatus 10 may also establish a connection on a second server S2 that is different from the first server S1 when the remote apparatus 10 confirms the request for video conference, so that the second server S2 with higher capability may be employed to process large quantity of data transmission. In addition, the first server S1 and the second server S2 may be combined into a super server in another embodiment so that the telephone 200 is capable of performing the authentication procedure on the super server as well as establishing a connection to the remote apparatus 10; the disclosure is not limited thereto.

In the embodiment, any data transmission between the telephone 200 and the remote apparatus 10 may be processed via the communication software 242 so that the video conference can be performed through an interface supported by the communication software 242. In another exemplary embodiment, after the telephone 200 establishes the connection to the remote apparatus 10 via the network module 230 through the communication software 242, the telephone 200 is capable of performing data transmission and exchange with the remote apparatus 10 directly by the network module 230 based on the established connection without the communication software 242. In other words, after the telephone 200 successfully establishes the connection to the remote apparatus 10, the telephone 200 may perform the video conference through the interface supported by the communication software 242, or stop executing the communication software 242 and change to perform the video conference by the transmission interface thereof according to the design requirement, the disclosure is not limited thereto.

Figures 1, 3A:
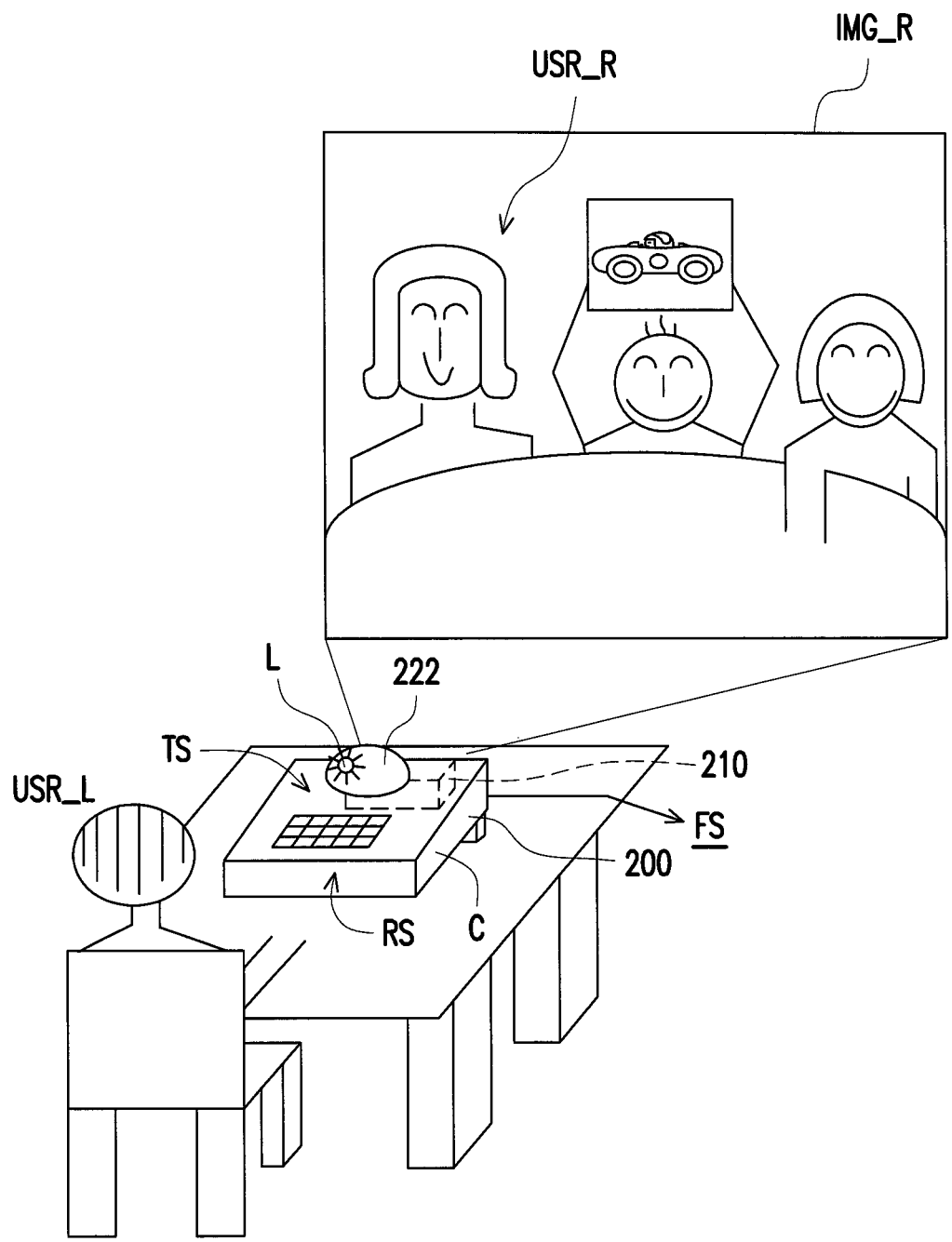
FIG. 3A-1 is a schematic view of performing a video conference using a telephone in an embodiment of the disclosure.

From the perspective of the hardware configuration, as shown in FIG. 3A-1, the telephone 200 includes a casing C, and each device in the telephone 200 may be configured in or on the casing C. The casing C has a front side FS, a rear side RS, and a top side TS. Specifically, a projection lens of the projection module 210 is disposed at the front side FS of the casing C, and the image capturing module 222 is disposed at the top side TS of the casing C, but the disclosure is not limited thereto. The audio output module 280 shown in FIG. 2A, such as an amplifier or a speaker, and the audio capturing module 224 shown in FIG. 2C, such as a microphone, may all be disposed at any side (not shown) of the casing C. When using a conventional projector, since the user generally sits relative to the rear side RS of the projector, in a preferable embodiment, the audio output module 280 and the audio capturing module 224 are disposed at the rear side RS of the casing C to achieve a better audio-amplifying and audio-receiving effect. In addition, according to the hardware configuration manner, an image projection direction of the projection module 210 (i.e. the direction of the projection of the remote user image IMG_R from the telephone 200) is not overlapped with an image capturing direction of the image capturing module 222 (i.e. the direction to capture the local user USR_L from the image capturing apparatus 222), and these two directions may be opposite to each other, but the invention is not limited thereto.

Additionally, in an embodiment, the telephone 200 may include a compensated light source L. Specifically, the processor 250 may enable the compensated light source L when detecting that the ambient light source is insufficient so that the compensated light source L is used to compensate for the light brightness or light intensity insufficient to the local user USR_L, thereby avoiding the image of the local user USR_L to be over dark. The compensated light source L may be, for example, a light source comprises light emitting diode (LED), and the compensated light source L may be disposed adjacent to the image capturing module 222, or be embedded in or externally connected to the rear side RS of the casing C; however, the disclosure is not limited thereto.

Figures 2, 3A:
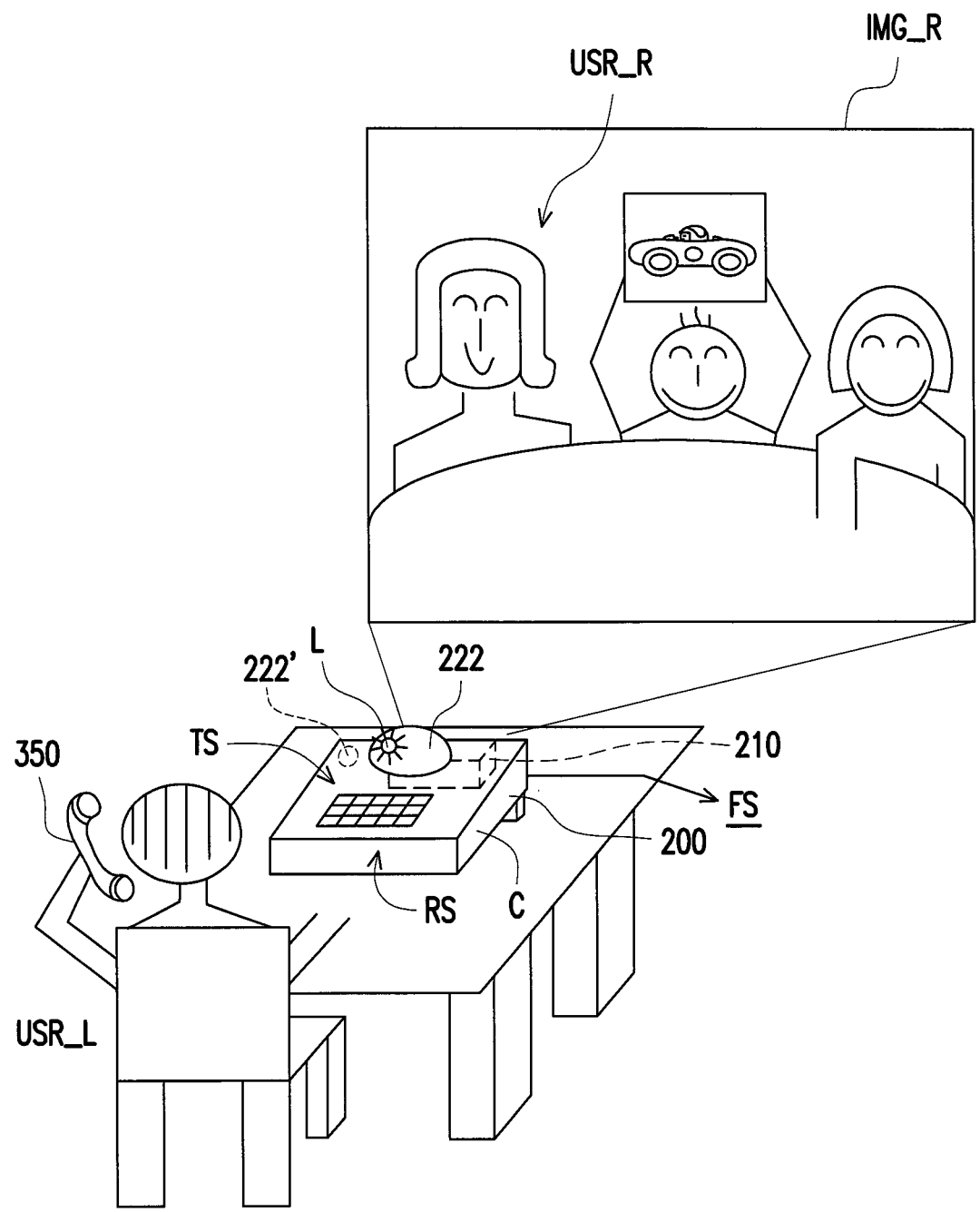

In other embodiment, as shown in FIG. 3A-2, the telephone 200 further includes a communication device 350 that may include the audio output module 280 and the audio capturing module 224 for broadcasting the remote audio data D_AR and capturing the local audio data D_AL. The communication device 350 may be electrically connected to the telephone 200 in a wired manner or in a wireless manner, so as to transmit the remote audio data D_AR and the local audio data D_AL. Besides, the telephone 200 may further include a battery (not shown) that may charge the communication device 350 when the communication device 350 is in contact with the telephone 200.

Figure 3B:
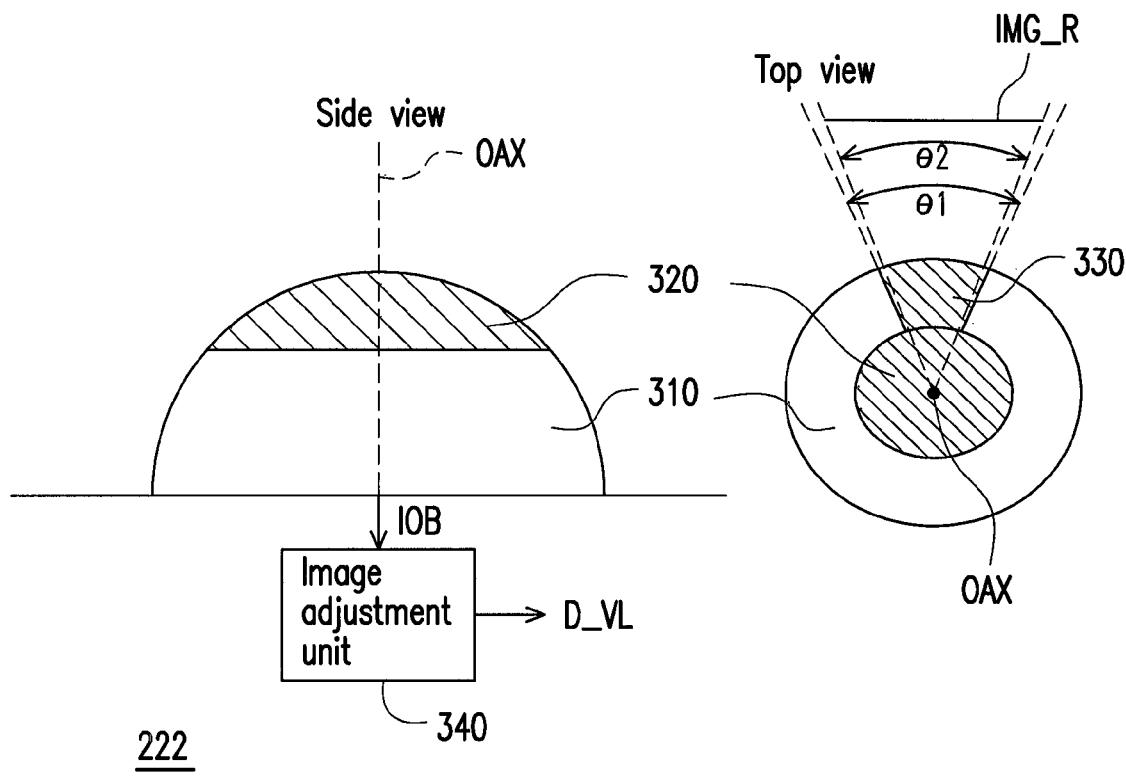
FIG. 3B is a schematic structural view of an image capturing module of a telephone in an embodiment of the disclosure.

FIG. 3B is a schematic structural view of an image capturing module of a telephone in an embodiment of the disclosure. Referring to FIGS. 2A-2C, FIG. 3A-1 and FIG. 3B, in the embodiment, the image capturing module 222 further includes a lens unit 310, a first shading unit 320, a second shading unit 330, and an image adjustment unit 340. The lens unit 310 may be a lens having a field of view of 180 degrees or a wide-angle lens having a field of view of at least 220 degrees. Besides, the lens unit 310 outputs a captured image IOB according to the image captured by the lens unit 310. Here, the lens unit 310 is a fish-eye lens, for instance. The first shading unit 320 is located on an optical axis OAX of the lens unit 310. If the telephone 200 is used when the indoor illumination lamp is turned on, the ambient light with sufficient brightness may affect and interference the quality of the image captured by the lens unit 310, and thus the first shading unit 320 may be applied to effectively block the ambient light.

The second shading unit 330 extends from the first shading unit 320 to an edge of the lens unit 310, and the second shading unit 330 is disposed between the lens unit 310 and the projection surface which the image IMG_R of the remote user is projected onto. Here, the second shading unit 330 serves to prevent the lens unit 310 from capturing the image IMG_R of the remote user projected onto the projection surface to avoid the mutual interference of images, the reduction of image brightness, and the deterioration of image contrast. A first opening angle θ1 of the second shading unit 330 with respect to the optical axis OAX covers a second opening angle θ2 of the image IMG_R of the remote user projected onto the projection surface with respect to the optical axis OAX. That is, the first opening angle θ1 is greater than the second opening angle θ2, and the second shading unit 330 completely covers the first opening angle θ1. Here, the first opening angle θ1 is smaller than or equal to 180 degrees.

The image adjustment unit 340 is coupled to the lens unit 310 to filter a portion of the captured image IOB corresponding to the first shading unit 320 and the second shading unit 330, straighten edges of an unfiltered portion of the captured image IOB to generate a reference image, and consider a rectangular image as the local video data D_VL, wherein the rectangular image is generated by cutting or affine-transforming the reference image.

In an embodiment of the invention, the first shading unit 320 and the second shading unit 330 may be thin films connected together and may be electroplated or adhered onto the lens unit 310. Alternatively, the first shading unit 320 and the second shading unit 330 may be connected together as a hard lid and may be disposed on the lens unit 310 or the housing C of the telephone 200. That is, the first shading unit 320 and the second shading unit 330 may directly contact with or may not be in contact with the lens unit 310. The first shading unit 320 is shaped as a circle, for instance, and the center of the first shading unit 320 may be substantially aligned to the optical axis OAX of the lens unit 310. However, the invention is not limited thereto, i.e., the first shading unit 320 may be shaped as any geometric figure, and the location of the first shading unit 320 may be adjusted according to the knowledge commonly known in the pertinent art. In another embodiment of the invention, the image capturing module 222 may be constituted by a plurality of video cameras. Alternatively, the voice of the user is obtained by the audio capturing module 224, such as a microphone, and the direction of the voice source of the user is determined by the analysis of the processor 250. The image capturing module 222 may be rotated by a mechanical device, so that the lens unit 310 may be aligned to the voice source for user.

Figure 3C:
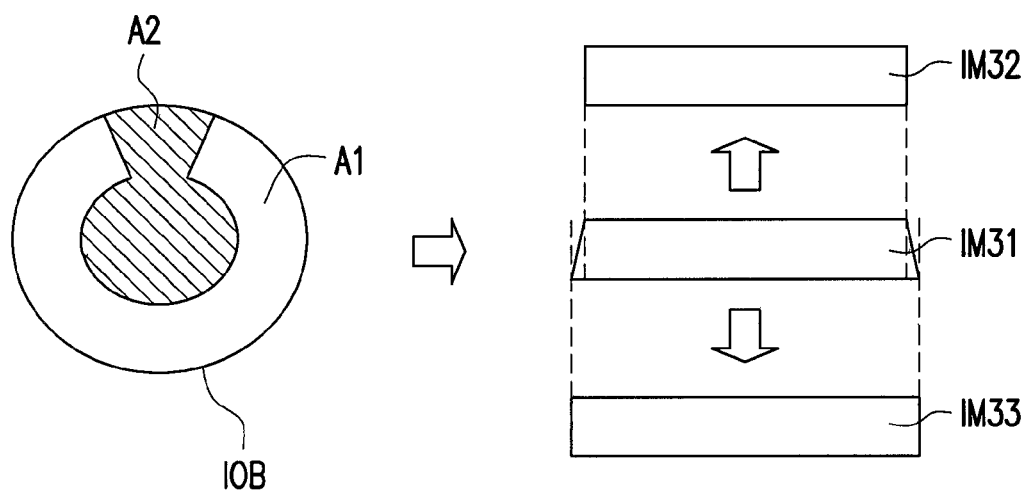
FIG. 3C is a schematic view of generating a local video-audio data in an embodiment of the disclosure.

FIG. 3C is a schematic view of generating the local video-audio data D_VAL in an embodiment of the disclosure. Referencing to FIG. 3A to FIG. 3C, in the embodiment, due to the configurations of the first and second shading units 320 and 330, the captured image IOB is substantially divided into two regions A1 and A2. Here, the region A1 of the captured image IOB corresponds to the actual image, and the region A2 of the captured image IOB corresponds to the images with the first and second shading units 320 and 330.

Since the region A2 does not correspond to the actual image, the image adjustment unit 340 filters the region A2 (i.e., the portion corresponding to the first and second shading units 320 and 330) of the captured image JOB; the unfiltered portion of the captured image IOB (i.e., the region A1) is processed to straighten edges of the region A1 to generate a reference image IM31. Here, the reference image IM31 may be shaped as a trapezoid. The image adjustment unit 340 then generates a rectangular image by cutting or affine-transforming the reference image IM31.

If the edge of the reference image IM31 is cut, a rectangular image IM33 may be created. Alternatively, if the reference image IM31 is affine-transformed, a rectangular image IM32 may be created. Both the reference image IM32 and the reference image IM33 may serve as the local video data D_VL, while the difference between the reference images IM32 and IM33 rests in the width.

Figure 4A:
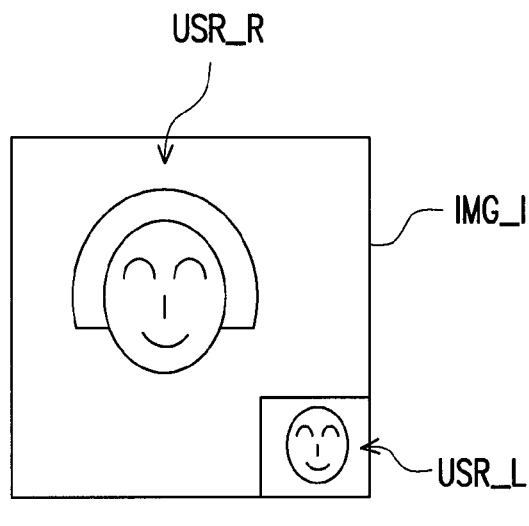
FIG. 4A is a schematic view of performing the projection of an image using a telephone in an embodiment of the disclosure.
Figure 4B:
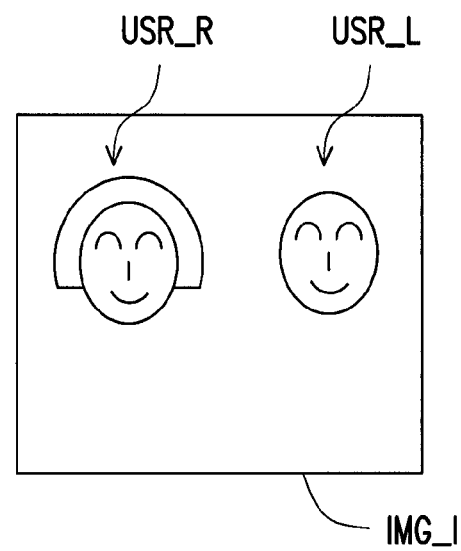
FIG. 4B is a schematic view of performing the projection of another image using a telephone in an embodiment of the disclosure.
Figure 4C:
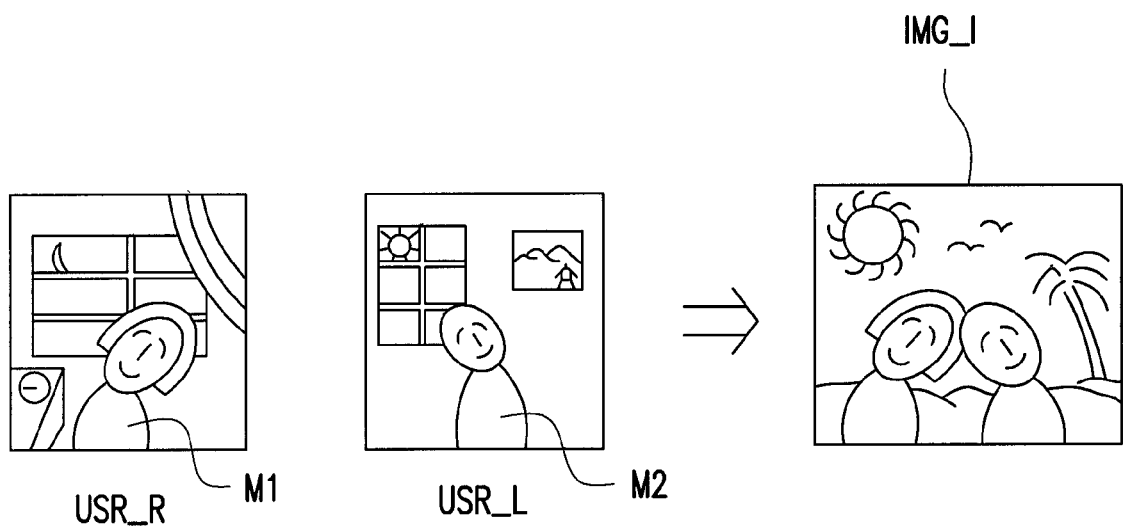
FIG. 4C is a schematic view of performing the projection of another image using a telephone in an embodiment of the disclosure.

FIGS. 4A-4C are schematic views of performing the projection of an image using a telephone in an embodiment of the disclosure. Referring to FIGS. 2A, 2C, 4A, and 4B, the image processing module 250-1 is capable of performing an image integration processing to the received remote video data D_VR and the local video data D_VL captured by the image capturing module 222, such that the projection module 210 projects an integrated image IMG_I which includes both the local user USR_L and the remote user USR_R. In the embodiment, the local user USR_L can select the image output type of the telephone 200 depending on the local user's requirement, and set the display format of the integrated image IMG_I using the input apparatus and/or the OSD interface. For example, the local user USR_L can select to output the image (such as IMG_R) of the remote user USR_R or the integrated image IMG_I depending on the requirement.

On the other hand, when the telephone 200 outputs the integrated image IMG_I, the local user USR_L can use the input apparatus and/or the on OSD interface to adjust the image proportion and position of the remote user USR_R and the local user USR_L. Referring to FIGS. 4A and 4B, according to the local user's predetermined setting, the way in which the integrated image IMG_I is displayed is adjusted, for example, to be displayed as picture-in-picture or in half. An embodiment of the disclosure uses the image processing module 250-1 such as an image processing chip or image processing circuit to execute the image blending technique so that a seam does not emerge in the integrated image IMG_I of the local user USR_L and the remote user USR_R, such that the integrated image IMG_I looks nicer and clearer. Moreover, the telephone 200 projects the integrated image IMG_I, allowing the local user USR_L to feel like being in the same place as the remote user USR_R or to feel like having a face-to-face communication with the remote user USR_R when conducting a video conference with the remote user USR_R.

Referring to FIG. 4C, in another embodiment, the image of the remote user USR_R and the image of the local user USR_L may be further blended and integrated. Furthermore, the image processing module 250-1 may be employed to further modify and adjust the background according to the setting of the local user USR_L to achieve the image display requirement of the local user USR_L. Specifically, the image processing module 250-1 captures the image of the local user USR_L (i.e., a human portrait portion M1 of the local video data D_VL) and the image of the remote user USR_R (i.e., a human portrait portion M2 of remote local video data D_VR) and pastes the human portrait portions M1 and M2 (captured according to the settings required by the local user USR_L or the remote user USR_R) onto the background pattern to compose the integrated image IMG_I.

In yet another embodiment, the image processing module 250-1 may be combined with the processor 250 so that the local user USR_L and the remote user USR_R may also perform image blending via the processor 250.

Figure 5A:
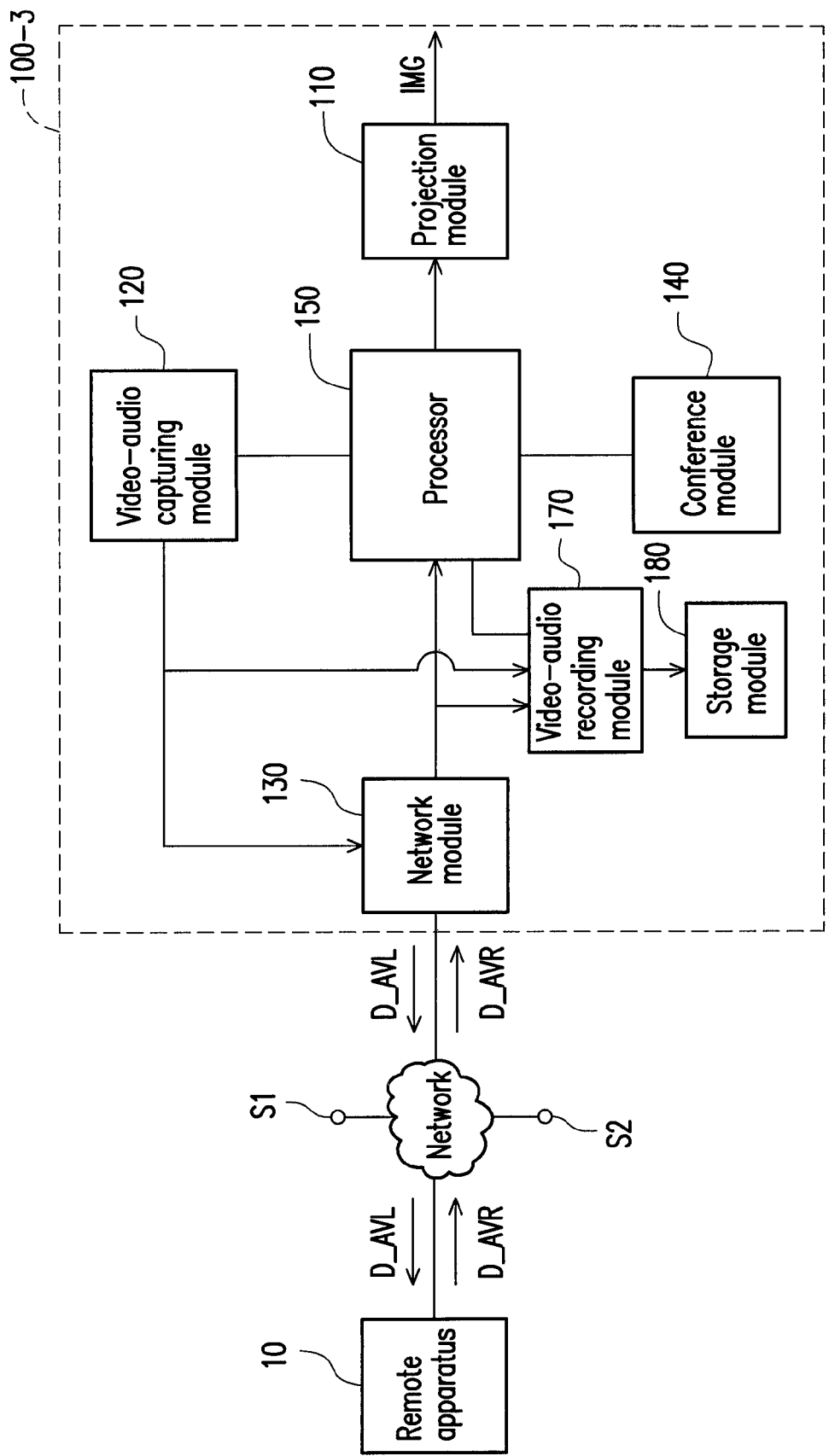
FIG. 5A is a schematic view of video-audio data transmission by a telephone in an embodiment of the disclosure.

FIG. 5A is a schematic view of video-audio data transmission by a telephone in an embodiment of the disclosure. The difference between a telephone 100-3 in FIG. 5A and the telephone 100-1 in FIG. 1A lies in that the telephone 100-3 further includes a video-audio recording module 170 and a storage module 180. The video-audio capturing module 120 is electrically connected to the network module 130 and the video-audio recording module 170. When the video conference function of the conference module 140 is enabled, such as a video-audio recording chip, a chip including a video-audio recording firmware or software, is enabled via the processor 150 so that the local video-audio data D_AVL and the remote video data D_AVR captured by the video-audio capturing module 120 may be further recorded and stored in the storage module 180 via the video-audio recording module 170. The storage module 180 may be a random access memory (RAM) disposed in the telephone 100-3, a storage apparatus which outputted to from an input/output port (I/O port) such as a USB drive and a memory card, or other common storage apparatuses.

Figure 5B:
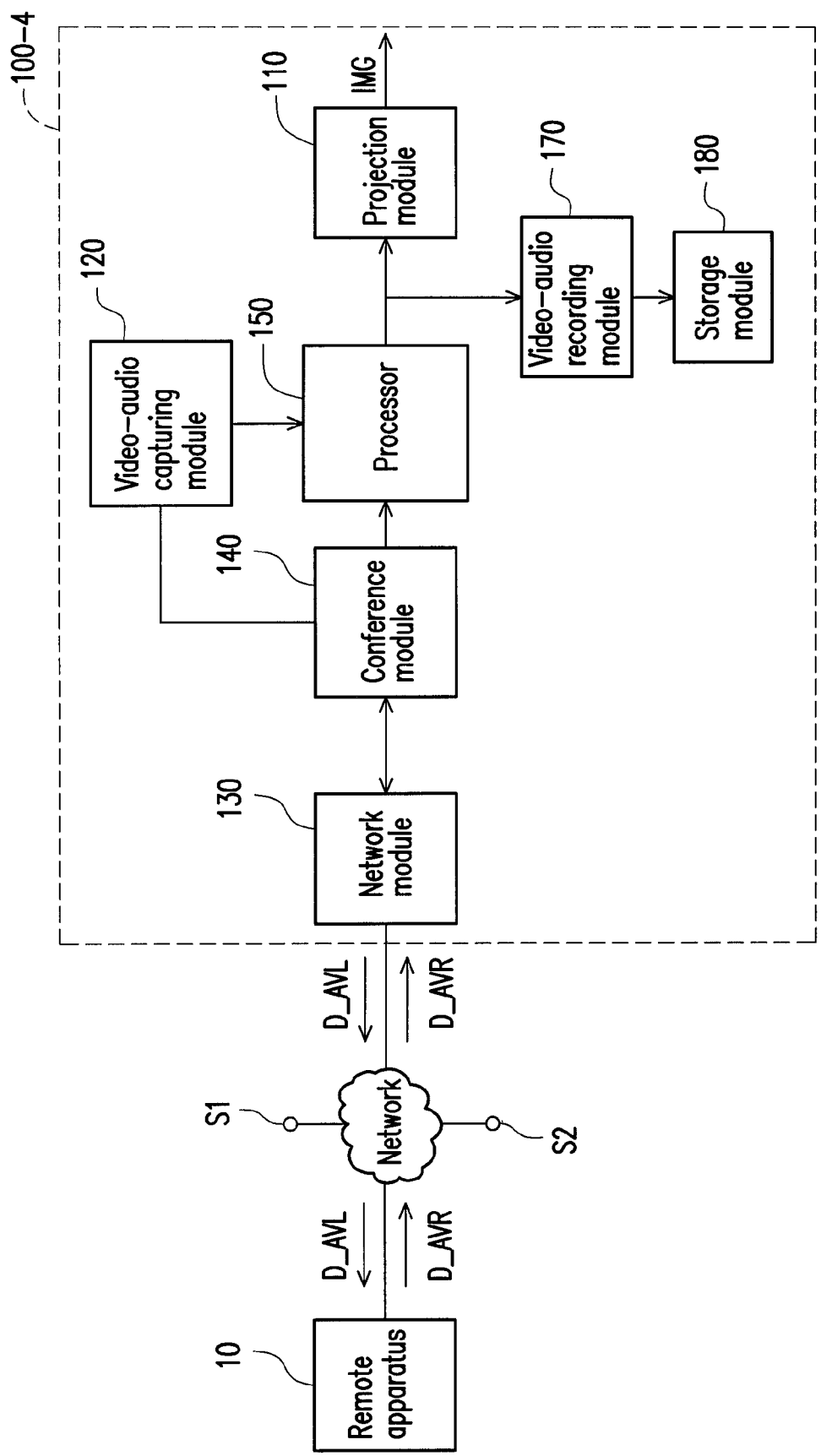
FIG. 5B is a schematic view of video-audio data transmission by a telephone in another embodiment of the disclosure.

FIG. 5B is a schematic view of video-audio data transmission by a telephone in another embodiment of the disclosure. In the embodiment, a telephone 100-4 enables the video-audio recording module 170 via the processor 150 such that the image IMG generated by image blending using the local video-audio data D_AVL captured by the video-audio capturing module 120 and the remote video-audio data D_AVR is recorded by the video-audio recording module 170 and then stored in the storage module 180.

Figure 5C:
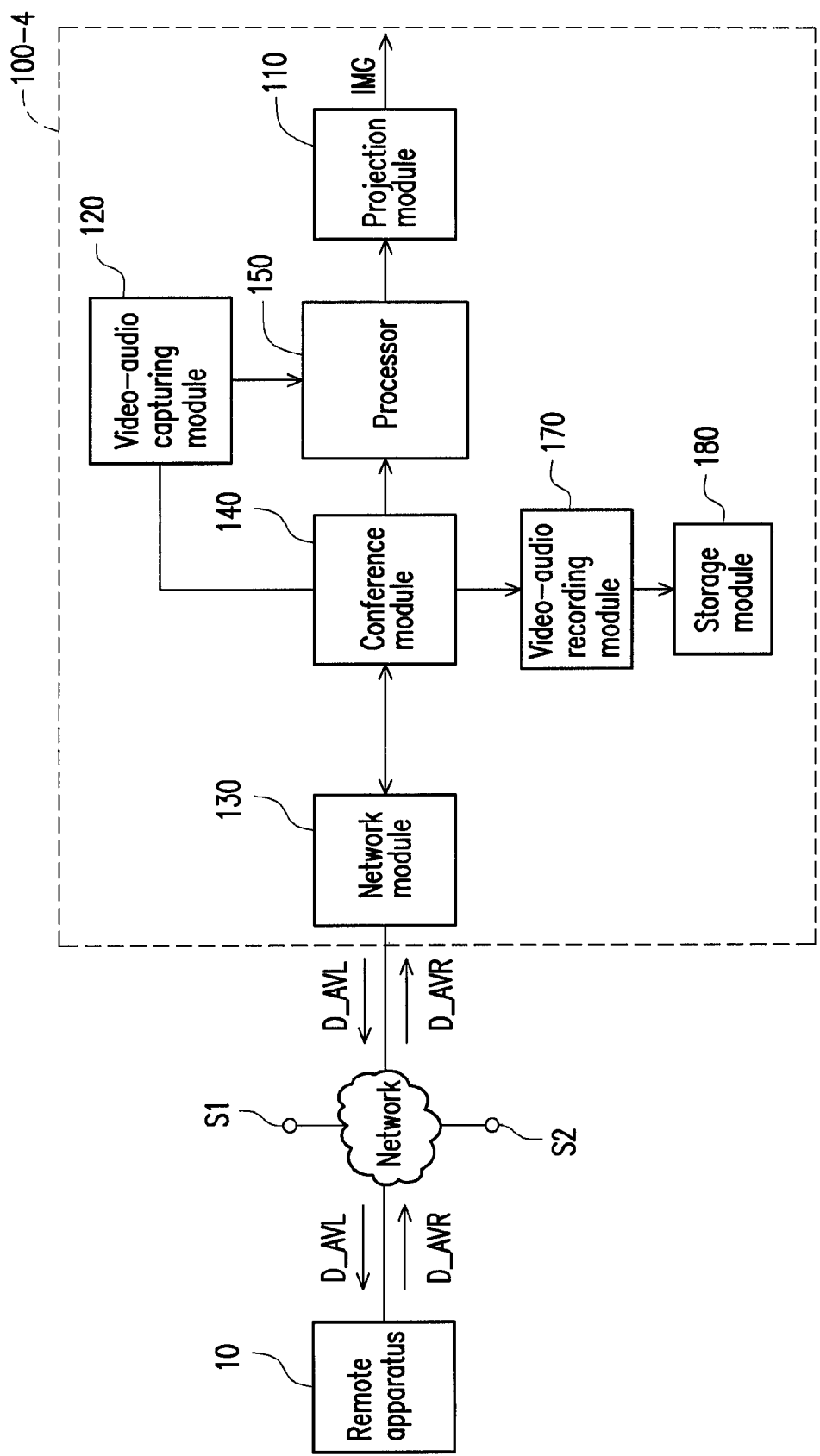
FIG. 5C is a schematic view of video-audio data transmission by a telephone in another embodiment of the disclosure.

In addition, FIG. 5C is a schematic view of video-audio data transmission by a telephone in yet another embodiment of the disclosure. In the embodiment, the remote video-audio data D_AVR provided by the remote apparatus 10 is transmitted to the conference module 140 via the network module 130; thereafter, since the conference module 140 of a telephone 100-5 is electrically connected to the video-audio recording module 170, the remote video-audio data D_AVR is recorded via the video-audio recording module 170 through the conference module 140 and then stored in the storage module 180. In other embodiments, through the conference module 140, the remote video-audio data D_AVR and the local video-audio data D_AVL captured by the video-audio capturing module 120 are recorded via the video-audio recording module 170 and then stored in the storage module 180. It should be understood that, in the embodiments of FIG. 5A, 5B, or 5C, the video-audio recording module 170 may also record the remote video-audio data D_AVR and the local audio data D_AL only.

In another embodiment of the disclosure, the video-audio recording module 170 may also be combined with the conference module 140 to be in the same module/circuit/chip design, but the disclosure is not limited thereto. In yet another embodiment, the communication software 242 also has a function that a video-audio recording software has.

Moreover, in another embodiment of the disclosure, referencing the FIGS. 2A-2C, 5A-5C and FIG. 3A-2, a front side image capturing module 222' is disposed at the front side FS of the telephone 200 for capturing an image projected onto the projection surface (such as the remote user image IMG_R or the integrated image IMG_I). Here, the image captured by the front side image capturing module 222' may be processed, such that the image USER_L of the local user and the image IMG_R of the remote user may be combined to compose the integrated image IMG_I. Said image processing step may be performed in the image processing module 250-1. The front side image capturing module 222' is electrically connected to the processor 250, and the front side image capturing module 222', audio processing module 270, and the audio capturing module 224 are electrically connected to the audio recording module 170; therefore, through the front side photograph module 222', the telephone 200 may record the remote user image IMG_R (or integrated image IMG_I) projected onto the screen, the voice of the local user recorded by the audio capturing module 224, and the remote audio data processed by the audio processing module 270 via the video-audio recording module 170 and then store them in the storage module 180.

Figure 6:
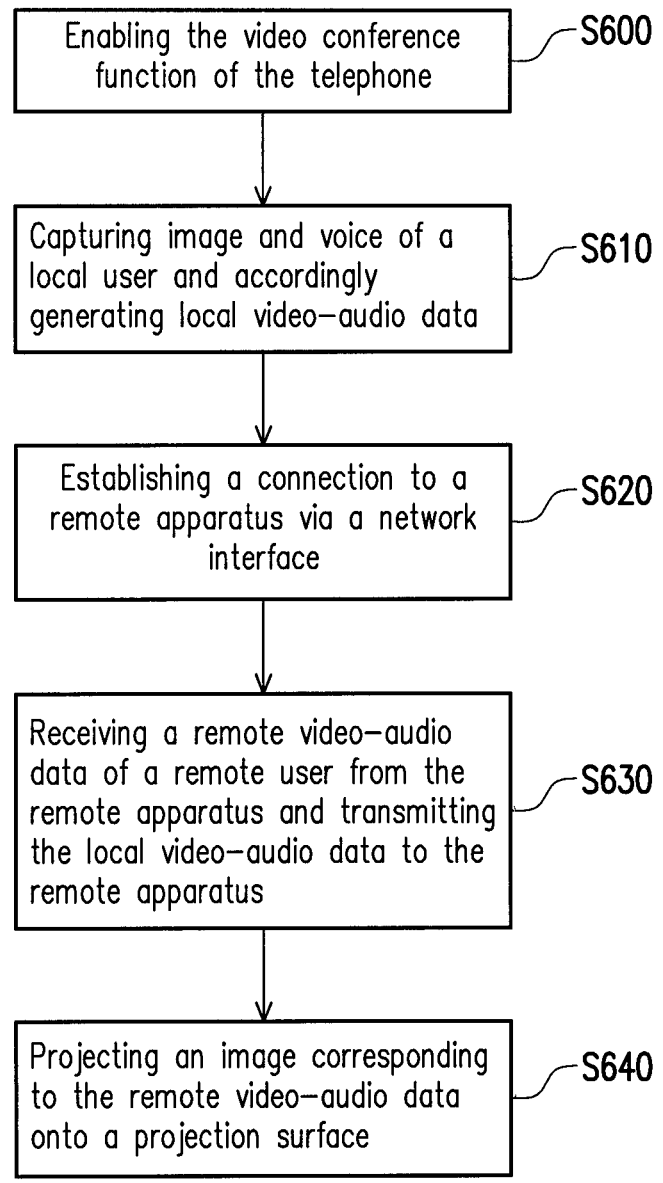
FIG. 6 is a flowchart of the steps in a method of performing a video conference using a telephone in an embodiment of the disclosure.

FIG. 6 is a flowchart of the steps in a method of performing a video conference using a telephone in an embodiment of the disclosure. The method is adaptable for the telephones 100-1, 100-2, and 200 described in the embodiments in FIGS. 1A, 1B, and 2A-2C. Referring to FIG. 6, first of all, the video conference function of the telephone is enabled (step S600). Thereafter, the image and voice of the local user are captured and the local video-audio data is generated accordingly (step S610). Next, the connection to the remote apparatus (such as 10) is established through the network interface (step S620) so that the remote video-audio data of the remote user is received from the remote apparatus, and then the local video-audio data is transmitted to the remote apparatus (step S630). After the remote video-audio data is received, the image corresponding to the remote video-audio data is projected onto the projection surface (step S640).

Figure 7:
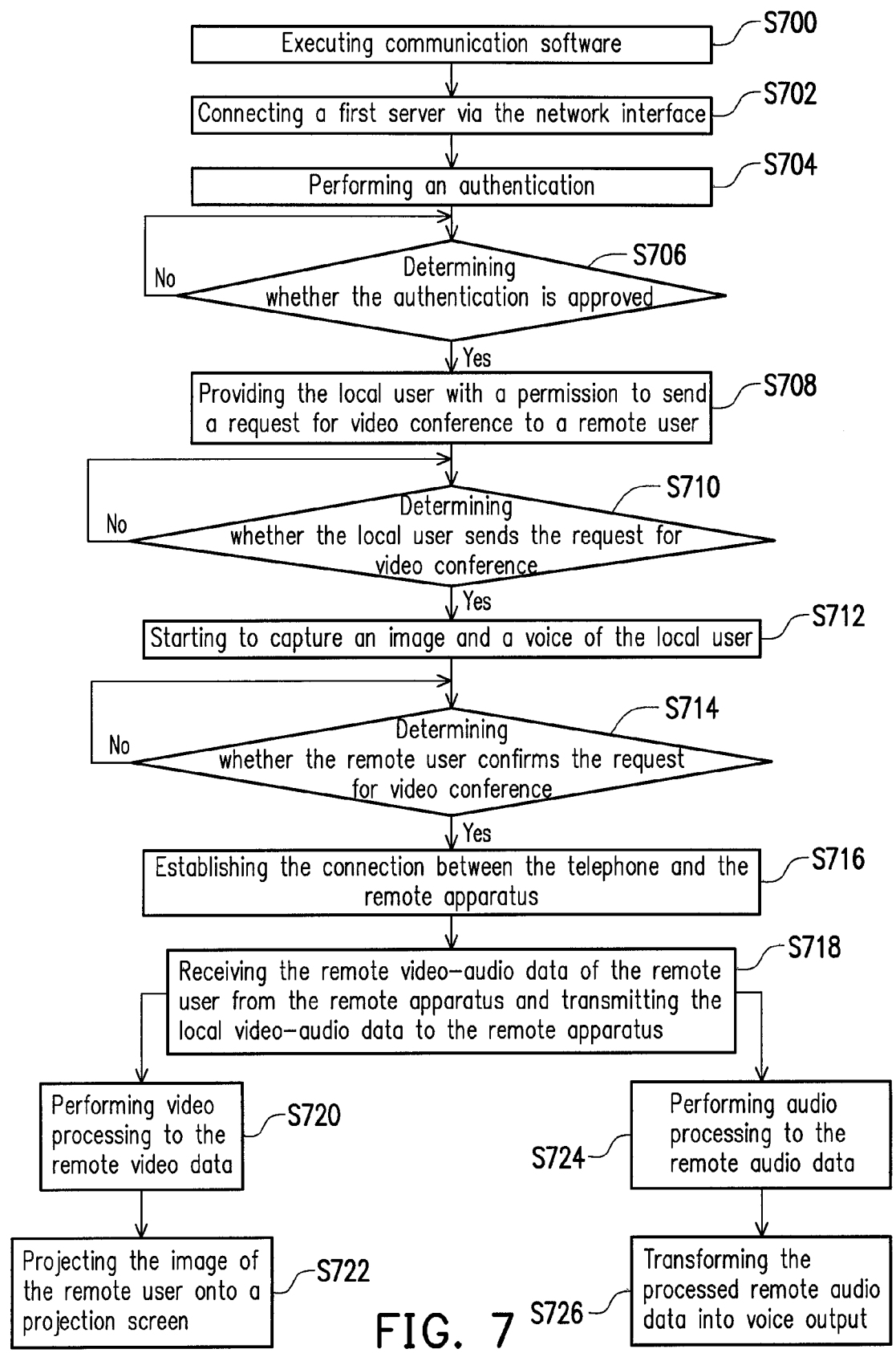
FIG. 7 is a flowchart of the steps in a method of performing a video conference using a telephone in another embodiment of the disclosure.

FIG. 7 is a flowchart of the steps in a method of performing a video conference using a telephone in another embodiment of the disclosure. The method is adaptable for the telephones 100-1, 100-2, and 200 described in the embodiments in FIGS. 1A, 1B, and 2A-2C. Referring to FIG. 7, first of all, the local user may execute the communication software (step S700) to be connected to the first server via the network interface provided by the network module (such as 230) (step S702). Subsequently, the communication software requests the local user to perform an authentication procedure (step S704) and determines whether the authentication procedure is approved (step S706). The communication software further provides the local user with the permission to send a request for video conference to the remote user when the authentication procedure of the local user is approved (step S708), and determines whether the local user sends the request for video conference (step S710). When the local user sends a request for video conference, the telephone starts to capture the image and voice of the local user (step S712) to generate the local video-audio data; the communication software determines whether the remote user confirms the request for video conference (step S714). After the remote user confirms the request for video conference, the communication software establishes a connection between the telephone and the remote apparatus on the first server or a second server (step S716).

After the connection is established, the telephone receives the remote video-audio data of the remote user from the remote apparatus (including the remote video data and the remote audio data), and then transmit the local video-audio data (including the local video data and the local audio data) to the remote apparatus (step S718). Before transmitting the local video data and the local audio data to the remote apparatus, the telephone may perform the image compression and audio compression processing process to the local video data and the local audio data, thereby reducing the quantity of data to be transmitted.

On the other hand, after the telephone receives the remote video data, an image processing is performed to decompress the remote video data (step S720), and the image of the remote user is projected onto the projection surface according to the processed remote video data (step S722). Similarly, an audio processing is performed to decompress the remote audio data (step S724), and the processed remote audio data is transformed into a voice output (step S726).

Figure 8:
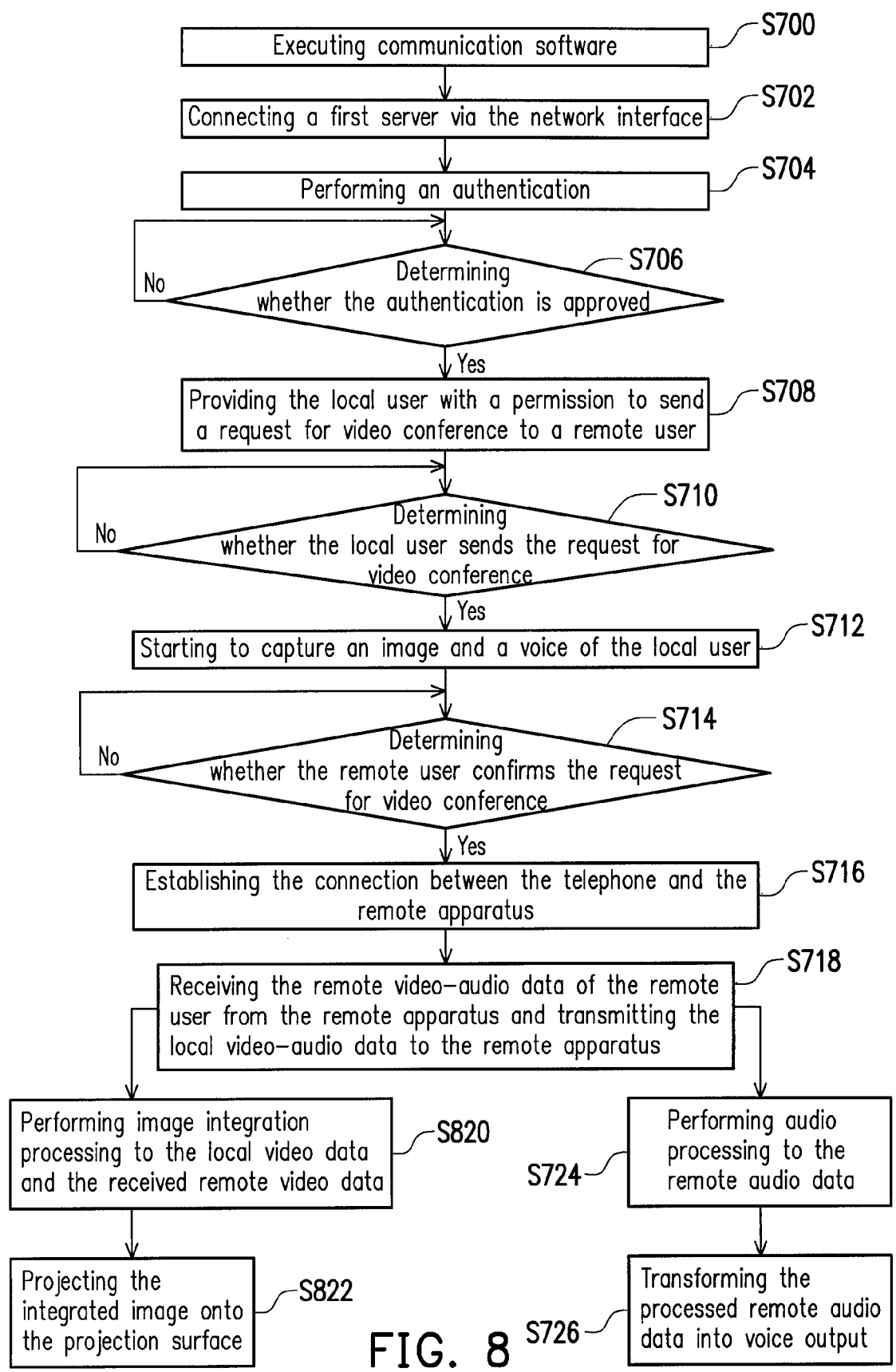
FIG. 8 is a flowchart of the steps in a method of performing a video conference using a telephone in yet another embodiment of the disclosure.

FIG. 8 is a flowchart of the steps in a method of performing a video conference using a telephone in yet another embodiment of the disclosure. The method is adaptable for the telephones 100-1, 100-2, and 200 described in the embodiments in FIGS. 1A, 1B, and 2A-2C. Referring to FIG. 8, in the embodiment, steps S700-S718 as well as steps S724 and S726 are substantially the same as that in the embodiment in FIG. 7; therefore, no further relevant description is incorporated herein. The difference between the embodiment in FIG. 8 and that in FIG. 7 lies in that, after step S718, the telephone performs image integration processing to the local video data and the received remote video data (step S820), such that the telephone projects the integrated image that includes the image of the local user and the image of the remote user onto the projection surface according to the processed local video data and the remote video data (step S822).

The methods described in FIGS. 6-8 can be fully supported and taught by the illustration of foregoing figures; therefore the similar or the same features are not further described hereinafter.

Figure 9:
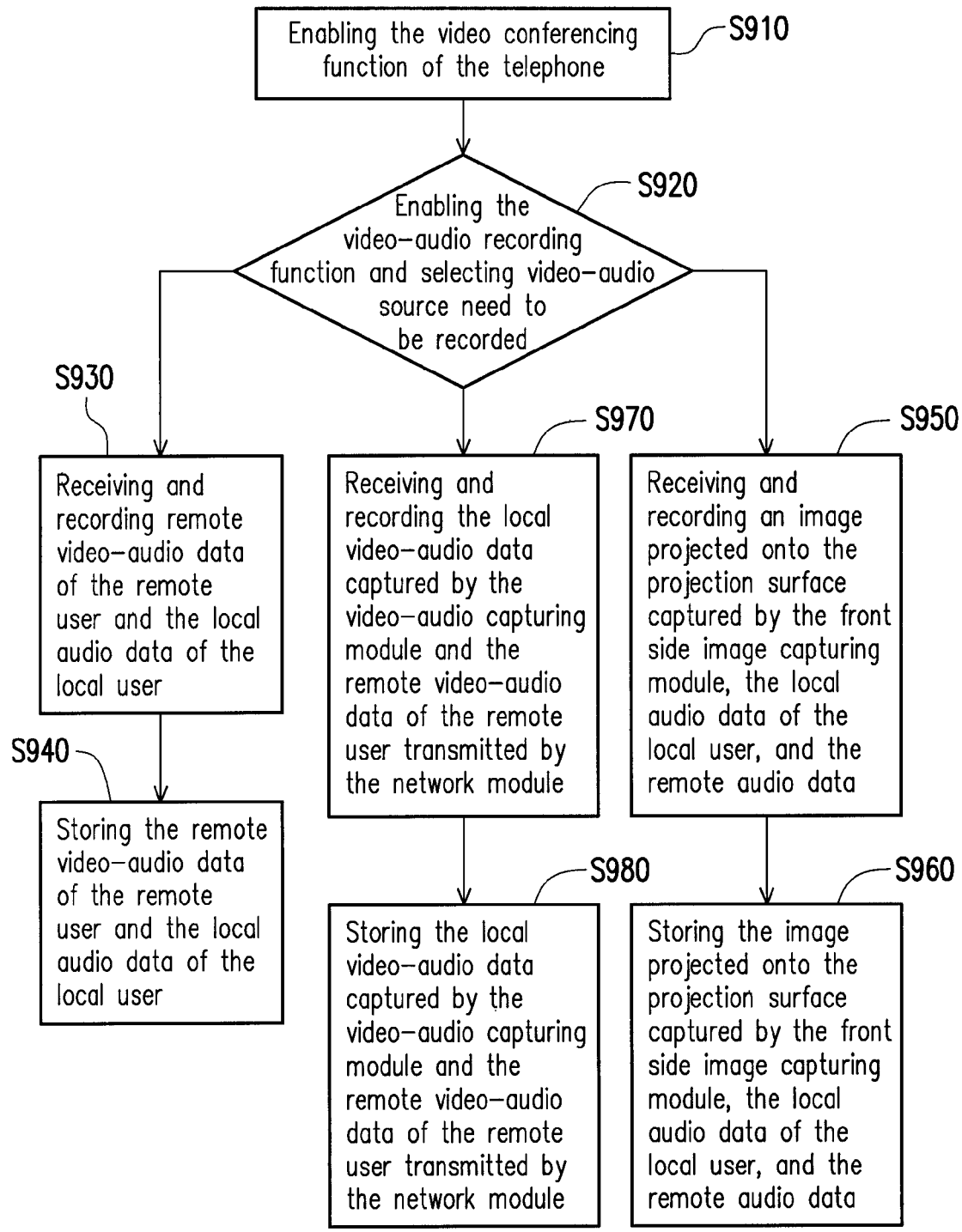
FIG. 9 is a flowchart of the steps in a method of performing video-audio recording using a telephone in an embodiment of the disclosure.

FIG. 9 is a flowchart of the steps in a method of performing video-audio recording using a telephone in another embodiment of the disclosure. The method described herein is adaptable for the telephones 100-3, 100-4, and 100-5 described in the embodiments in FIGS. 5A-5C. Referring to FIG. 9, in the embodiment, first of all, the video conference function of the telephone is enabled (step S910). Thereafter, the processor 150 enables the video-audio recording function of the video-audio recording module 170 and selects the video-audio source needed to be recorded according to the setting of the local user (step S920). At this time, there are at least three options for selecting the video-audio source. For example, the video-audio recording module 170 receives the remote video-audio data D_AVR of the remote user transmitted via the network module 130 and the local audio data D_AL captured by the audio capturing module and further records them (step S930), and then uses the storage module 180 to store the recorded remote video-audio data of the remote user and the local audio data D_AL (step S940). An alternative option is that, after receiving and recording the image (projected image) projected onto the projection surface captured by the front side capturing module, the local audio data captured by the audio capturing module, and the remote audio data outputted by the audio processing module (step S950), the projected image and the audio data are stored in the storage module 180 (step S960). Yet another option is that the local video-audio data captured by the video-audio capturing module 120 and the remote video-audio data of the remote user are received and recorded (step S970), and then the local video-audio data as well as the remote video-audio data are stored in the storage module 180 (step S980). In other embodiments, the method of performing video-audio recording by the telephone does not necessarily have the foregoing options; that is, the telephone may have one of the video-audio recording methods only.

In other embodiments, the telephone shows a screen for the user to select a projection function after being turned on; for example, a figure or text indicating the video conference function or general projection operation is shown for the user to select either one (i.e. receiving the image or video data from the I/O port). When the user selects the figure or text indicating the video conference function, the telephone projects a user log-in screen, and the user can enter the user's identification via the input apparatus and/or an on screen display keypad so as to perform the authentication procedure with the first server or the second server.

Based on the aforementioned, the embodiments of the disclosure provide a telephone with a video function and a method of performing a video conference using the telephone. The telephone incorporates the network and a video-audio capturing function therein so that a local user can directly perform the video conference with a remote user via the telephone. The telephone is capable of establishing an operation environment for the video conference without a complicated accessories-assembling process, and the image displayed by the telephone is not restricted to the size and specification of the conventional displays, thereby providing the user with more convenience and mobility. Additionally, in the embodiments, the conference content can be recorded in a storage module via a video-audio recording module to be read or reviewed in the future.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims. In addition, the language, such as "first" and "second" mentioned in the specification or claims are only intended to name elements or discriminate different embodiments or scopes, and are not intended to limit an upper limit or a lower limit of the number of the elements.

What is claimed is:

1. A telephone with a video function, comprising:
a projection module;
a network module, providing a network interface;

a video-audio capturing module, electrically connected to the network module and configured to capture an image and voice of a local user, and accordingly generating a local video-audio data;

a conference module, providing a video conference function;

a processor, electrically connected to the projection module, the network module, the video-audio capturing module and the conference module, wherein when the processor enables the video conference function of the conference module, the telephone establishes a connection to a remote apparatus via the network interface of the network module, thereby receiving a remote video-audio data of a remote user from the remote apparatus and transmitting the local video-audio data to the remote apparatus, the local video-audio data comprises a local video data and a local audio data, and the remote video-audio data comprises a remote video data and a remote audio data;

an image processing module in the telephone, the image processing module being electrically connected to the processor, for performing an image processing to at least one of the local video data and the remote video data; and an audio processing module in the telephone, the audio processing module being electrically connected to the processor, for performing an audio processing to the remote audio data, wherein the projection module is controlled by the processor so as to project an image corresponding to the remote video-audio data onto a projection surface, wherein the conference module comprises a memory which comprises a communication software, and the processor enables the video conference function by executing the communication software, wherein when the communication software is executed, the telephone is connected to a first server via the network interface to perform an authentication procedure, when the authentication procedure is approved, the communication software provides the local user with a permission to send a request for video conference to the remote user, when the local user sends the request for video conference, the processor enables the video-audio capturing module, when the remote user confirms the request for video conference, the communication software establishes a connection between the telephone and the remote apparatus on the first server, and when the remote user confirms the request for video conference, the communication software establishes a connection between the telephone and the remote apparatus on a second server.

2. The telephone with the video function according to claim 1, wherein the projection module projects the image onto the projection surface according to the remote video data processed by the image processing module.

3. The telephone with the video function according to claim 1, wherein the image processing module blends the local video data and the remote video data to an integrated image, and the projection module projects the integrated image onto the projection surface.

4. The telephone with the video function according to claim 3, wherein the image processing module captures a human portrait portion from the local video data and the remote video data and pastes the captured human portrait portion onto a background pattern to compose the integrated image.

5. The telephone with the video function according to claim 1, further comprising:
an audio output module, electrically connected to the audio processing module, for transforming the remote audio data after being processed into a voice output.

6. The telephone with the video function according to claim 1, wherein the telephone further comprises: a video processing module, electrically connected to the network module and the image processing module, for transforming the remote video data into a format projectable by the telephone.

7. The telephone with the video function according to claim 1, wherein the image processing module is included in the processor.

8. The telephone with the video function according to claim 1, wherein the conference module comprises a memory which comprises a communication software, and the processor enables the video conference function by executing the communication software.

9. The telephone with the video function according to claim 8, wherein the telephone further comprises:
a video decompression module, electrically connected to the conference module and the network module, for performing the image processing to the remote video data, and then outputting the processed remote video data to the conference module; and
an audio decompression module, electrically connected to the conference module and the network module, for performing the audio processing to the remote audio data, and then outputting the processed remote audio data to the conference module.

10. The telephone with the video function according to claim 9, wherein the video decompression module and the audio decompression module are included in the conference module.

11. The telephone with the video function according to claim 8, wherein the telephone further comprises:
a video processing module, electrically connected to the image processing module;
a video decompressing module, electrically connected to the video processing module and the network module, for performing the image processing to the remote video data, and then outputting the processed remote video data to the video processing module; and
an audio decompression module, electrically connected to the audio processing module and the network module, for performing the audio processing to the remote audio data, and then outputting the processed remote audio data to the audio processing module.

12. The telephone with the video function according to claim 1, wherein the video-audio capturing module comprises:
an image capturing module, configured to capture the image of the local user, and generating the local video data accordingly; and
an audio capturing module, configured to capture the voice of the local user, and generating the local audio data accordingly.

13. The telephone with the video function according to claim 12, wherein the image capturing module has a 90-degree or greater field of view.

14. The telephone with the video function according to claim 12, wherein the image capturing module comprises:
a lens unit, having a field of view of 180 degrees and outputting a captured image;
a first shading unit, located on an optical axis of the lens unit;

a second shading unit, extending from the first shading unit to an edge of the lens unit, the second shading unit being disposed between the lens unit and the projection surface where the image is projected onto, a first opening angle of the second shading unit with respect to the optical axis covering a second opening angle of the image projected onto the projection surface with respect to the optical axis;

an image adjustment unit coupled to the lens unit to filter a portion of the captured age corresponding to the first shading unit and the second shading unit, straighten edges of an unfiltered portion of the local image data to generate a reference image, and consider a rectangular image as the local image data, wherein the rectangular image is generated by cutting or affine-transforming the reference image.

15. The telephone with the video function according to claim 14, wherein the lens unit is a fish-eye lens.

16. The telephone with the video function according to claim 14, wherein the first shading unit and the second shading unit are thin films or hard lids.

17. The telephone as recited in claim 14, wherein the second shading unit completely covers the first opening angle.

18. The telephone with the video function according to claim 12, further comprising a compensated light source disposed adjacent to the image capturing module and configured to compensate light insufficient for the local user.

19. The telephone with the video function according to claim 12, wherein the telephone further comprises a casing which has a front side, a rear side, and a top side, the projection module projects an image beam onto the projection surface, wherein the image capturing module is disposed at the top side, and an image capturing direction of the image capturing module is not overlapped with an image projection direction of the projection module.

20. The telephone with the video function according to claim 19, wherein the image capturing module has a field of view of 180 degree, and the telephone further comprises:
   a video-audio recording module, electrically connected to the processor, the image capturing module, the audio capturing module and the audio processing module; and
   a storage module, electrically connected to the video-audio recording module,
   wherein the video-audio recording module records the image projected onto the projection surface, the remote audio data and the local audio data, and stores the image on the projection surface, the remote audio data and the local audio data in the storage module.

21. The telephone with the video function according to claim 12, wherein the video-audio capturing module further comprises:
   a video compression module, electrically connected to the image capturing module and the network module, for performing an image processing to the local video data, and then outputting the processed local video data to the network module; and
   an audio compression module, electrically connected to the audio capturing module and the network module, for performing the audio processing to the local audio data, and then outputting the processed local audio data to the network module.

22. The telephone with the video function according to claim 1, further comprising one of an input apparatus and an on-screen display control interface.

23. The telephone with the video function according to claim 1, wherein the telephone further comprises a video-audio recording module and a storage module, wherein the video-audio recording module is electrically connected to the processor for recording the local audio data and the remote video-audio data, and storing the local audio data and the remote video-audio data in the storage module, wherein the storage module is electrically connected to the video-audio recording module.

24. The telephone with the video function according to claim 1, wherein the telephone further comprises a video-audio recording module and a storage module, wherein the video-audio recording module is electrically connected to the conference module for recording the remote video-audio data and the local video data, and storing the remote video-audio data and the local audio data in the storage module, wherein the storage module is electrically connected to the video-audio recording module.

25. The telephone with the video function according to claim 1, wherein the network interface comprises at least one of a wired network interface and a wireless network interface.

26. A method of performing a video conference using a telephone, comprising:
   enabling a video conference function of the telephone;
   capturing an image and voice of a local user, and accordingly generating a local video-audio data;
   establishing a connection to a remote apparatus via a network interface;
   receiving a remote video-audio data of a remote user from the remote apparatus, and transmitting the local video-audio data to the remote apparatus; and
   projecting an image corresponding to the remote video-audio data onto a projection surface, wherein the local video-audio data comprises a local video data and a local audio data, and the remote video-audio data comprises a remote video data and a remote audio data, further comprising steps of:
   in the telephone, performing an image processing to at least one of the local video data and the remote video data; and
   in the telephone, performing an audio processing to at least one of the local audio data and the remote audio data,
   wherein the step of enabling the video conference function of the telephone comprises:
   executing a communication software;
   connecting to a first server via the network interface;
   performing an authentication procedure;
   determining whether the authentication procedure is approved;
   when the authentication procedure is approved, providing the local user with a permission to send a request for video conference to the remote user;
   determining whether the local user sends the request for video conference;
   when the local user sends the request for video conference, starting to capture the image and voice of the local user, and determining whether the remote user confirms the request for video conference; and
   when the remote user confirms the request for video conference, establishing the connection between the telephone and the remote apparatus on a second server.

27. The method of performing the video conference using the telephone according to claim 26, wherein steps of capturing the image and voice of the local user and generating the local video-audio data accordingly comprise:
    capturing the image of the local user, and accordingly generating the local video data; and
    capturing the voice of the local user, and accordingly generating the local audio data.

28. The method of performing the video conference using the telephone according to claim 27, wherein steps of capturing the image of the local user, and accordingly generating the local video data comprise:
    filtering a portion of the image of the local user corresponding to a shading unit;
    straightening edges of an unfiltered portion of the image of the local user to generate a reference image; and
    considering a rectangular image as the local image data, wherein the rectangular image is generated by cutting or affine-transforming the reference image.

29. The method of performing the video conference using the telephone according to claim 26, further comprising a step of:
    projecting an image of the remote user onto the projection surface according to the remote video data after being processed.

30. The method of performing the video conference using the telephone according to claim 26, further comprising a step of:
    projecting an integrated image onto the projection surface according to the local video data and the remote video data both after being processed.

31. The method of performing the video conference using the telephone according to claim 30, further comprising:
    capturing a human portrait portion from the local video data and the remote video data; and
    pasting the captured human portrait portion onto a background pattern to compose the integrated image.

32. The method of performing the video conference using the telephone according to claim 26, further comprising a step of:
    transforming the remote audio data after being processed into a voice output.

33. The method of performing the video conference using the telephone according to claim 26, wherein after the authentication procedure is approved, the step of enabling the video conference function of the telephone further comprises:
    determining whether the local user sends the request for video conference;
    when the local user sends the request for video conference, starting to capture the image and voice of the local user, and determining whether the remote user confirms the request for video conference; and
    when the remote user confirms the request for video conference, establishing the connection between the telephone and the remote apparatus on the first server.

34. The method of performing the video conference using the telephone according to claim 26, wherein after the video conference function of the telephone is enabled, enabling a video-audio recording function.

35. The method of performing the video conference using the telephone according to claim 34, further comprising steps of:
    receiving and recording the remote video-audio data of the remote user transmitted by a network module and the local audio data, and storing the remote video-audio data of the remote user and the local audio data.

36. The method of performing the video conference using the telephone according to claim 34, further comprising steps of:
    after receiving an image projected onto the projection surface and captured by a front side image capturing module, the local audio data captured by an audio capturing module, and the remote audio data outputted by an audio processing module, storing the projected image, the local audio data and the remote audio data in the storage module.

37. The method of performing the video conference using the telephone according to claim 34, further comprising steps of:
    receiving and recording the local video-audio data of the local user captured by a video-audio capturing module and the remote video-audio data of the remote user transmitted by a network module, and storing the local video-audio data and the remote video-audio data.

* * * * *